US008298354B2

(12) United States Patent
Hata et al.

(10) Patent No.: US 8,298,354 B2
(45) Date of Patent: Oct. 30, 2012

(54) CORROSION AND HEAT RESISTANT METAL ALLOY FOR MOLDING DIE AND A DIE THEREWITH

(75) Inventors: Seiichi Hata, Yokohama (JP); Jyunpei Sakurai, Yokohama (JP); Akira Shimokohbe, Yokohama (JP); Shigeru Hosoe, Hachioji (JP); Hiroyuki Nabeta, Hachioji (JP)

(73) Assignee: Tokyo Institute of Technology, Tokyo (JP)

( * ) Notice: Subject to any disclaimer, the term of this patent is extended or adjusted under 35 U.S.C. 154(b) by 835 days.

(21) Appl. No.: 12/090,468

(22) PCT Filed: Oct. 18, 2006

(86) PCT No.: PCT/JP2006/320771
§ 371 (c)(1),
(2), (4) Date: Mar. 27, 2009

(87) PCT Pub. No.: WO2007/046437
PCT Pub. Date: Apr. 26, 2007

(65) Prior Publication Data
US 2009/0236494 A1    Sep. 24, 2009

(30) Foreign Application Priority Data

Oct. 19, 2005 (JP) ................ P2005-304908
Mar. 10, 2006 (JP) ................ P2006-066645

(51) Int. Cl.
*C22C 45/00* (2006.01)
*C22C 5/04* (2006.01)
(52) U.S. Cl. .............. 148/403; 420/466; 420/468

(58) Field of Classification Search .............. None
See application file for complete search history.

(56) References Cited

U.S. PATENT DOCUMENTS

| 4,339,270 | A | * | 7/1982 | Hashimoto et al. ........... 148/403 |
| 5,700,307 | A | * | 12/1997 | Kashiwagi et al. .......... 65/374.1 |
| 6,749,698 | B2 | * | 6/2004 | Shimizu et al. ............... 148/403 |
| 7,366,395 | B2 | * | 4/2008 | Yuasa et al. .................. 385/147 |
| 2004/0211222 | A1 | | 10/2004 | Hosoe |

(Continued)

FOREIGN PATENT DOCUMENTS

CN    1032408 A    4/1989
(Continued)

OTHER PUBLICATIONS

International Preliminary Report on Patentability issued by the International Bureau of WIPO on Jun. 19, 2008.

(Continued)

*Primary Examiner* — George Wyszomierski
(74) *Attorney, Agent, or Firm* — Oblon, Spivak, McClelland, Maier & Neustadt, L.L.P.

(57) ABSTRACT

It is found that alloys including amorphous phase comprising at least a first element selected from the group consisting of Pt and Ru, at least a second element selected from the group consisting of Zr, Hf, Si, Ir, Ru, Pd and Ni, and at least a third element selected from the group consisting of Si, Cu, Cr, Fe, Mo, Co, Al, Zr, Hf, Ni and Ru have excellent machining characteristics, heat-resistant characteristics, corrosion resistance and adhesion resistance. Using the alloys as the molding surface of a die, a heat resistant molding die for forming glass optical device having fine structure for performing high definite functions became possible to manufacture with excellent machining characteristics.

18 Claims, 29 Drawing Sheets

U.S. PATENT DOCUMENTS

2005/0200896 A1  9/2005  Narusawa et al.
2005/0226955 A1* 10/2005 Yuasa et al. .................. 425/406

FOREIGN PATENT DOCUMENTS

| | | |
|---|---|---|
| CN | 1743492 A | 3/2006 |
| EP | 0 310 680 A1 | 4/1989 |
| EP | 1 428 801 A2 | 6/2004 |
| JP | 60-264331 | 12/1985 |
| JP | 61-281028 | 12/1986 |
| JP | 63-262446 | 10/1988 |
| JP | 63-297230 | 12/1988 |
| JP | 64-72932 | 3/1989 |
| JP | 6-144850 | 5/1994 |
| JP | 8-333660 | 12/1996 |
| JP | 2000-256812 | 9/2000 |
| JP | 2002-53918 | 2/2002 |
| JP | 2003-154529 | 5/2003 |
| JP | 2003-160343 | 6/2003 |
| JP | 2003-301247 | 10/2003 |
| JP | 2004-315939 | 11/2004 |
| JP | 2005-131915 | 5/2005 |
| JP | 2005-209321 | 8/2005 |
| WO | WO 88/08192 | 10/1988 |

OTHER PUBLICATIONS

Chen, et al., "Elastic Constants, Hardness and Their Implications to Flow Properties of Metallic Glasses", Journal of Non-Crystalline Solids 18, pp. 157-171, (1975).

Matsubara, et al., "Local Atomic Structures in Amorphous and Quasicrystalline $Zr_{70}Ni_{10}Pt_{20}$ and $Zr_{80}Pt_{20}$ Alloys by the Anomalous X-ray Scattering Method", Mat. Res. Soc. Symp. Proc., vol. 644, pp. 1-5, (2001).

* cited by examiner

FIG.1
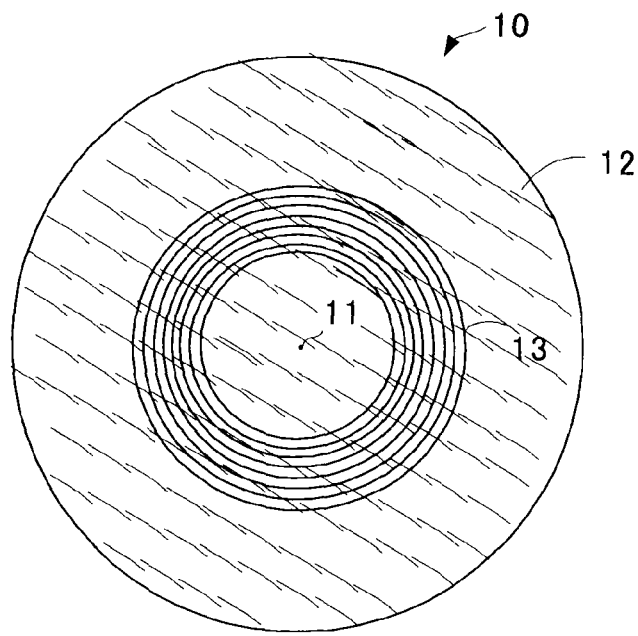
(a)
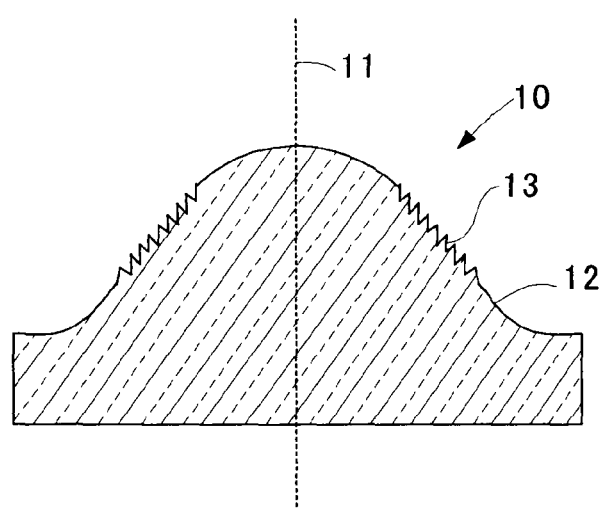
(b)

FIG.5
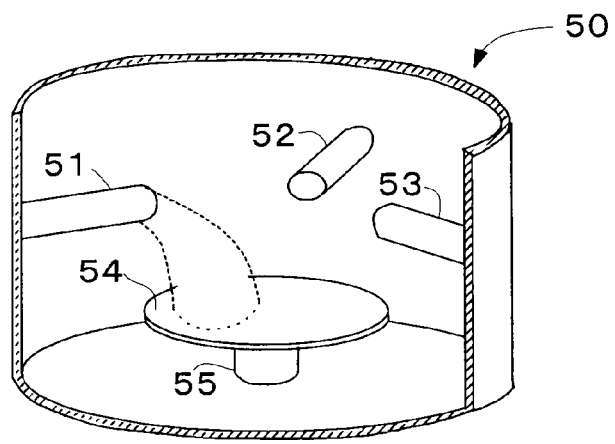
(a)
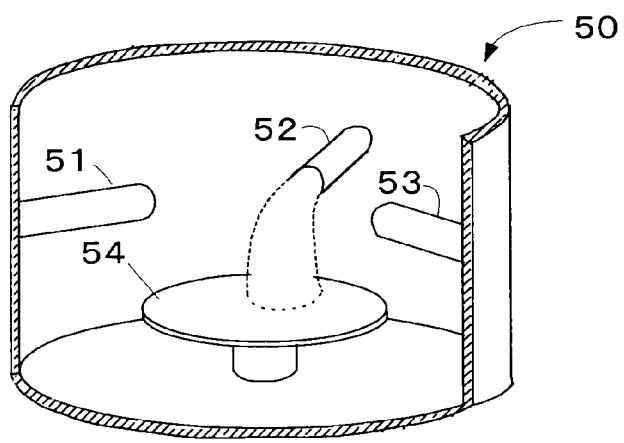
(b)
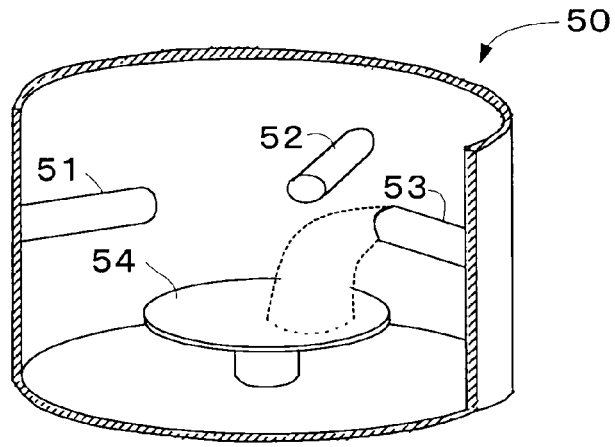
(c)

- Amorphous Phase.
- ⊗ Amorphous Phase.+Crystal Phase.
- ○ Crystal Phase.

● Amorphous Phase.
⊗ Amorphous Phase.+Crystal Phase.
○ Crystal Phase.

• Amorphous Phase.
⊗ Amorphous Phase.+Crystal Phase.
○ Crystal Phase.

• Amorphous Phase.
⊠ Amorphous Phase.+Crystal Phase.
○ Crystal Phase.

- Amorphous Phase.
- ⊗ Amorphous Phase.+Crystal Phase.
- ○ Crystal Phase.

• Amorphous Phase.
⊠ Amorphous Phase.+Crystal Phase.
○ Crystal Phase.

FIG.18
Pt$_{52}$Hf$_{36}$Ni$_{12}$ thin film, Tx <823K
Three Dimensional Figure of Indented Trace
 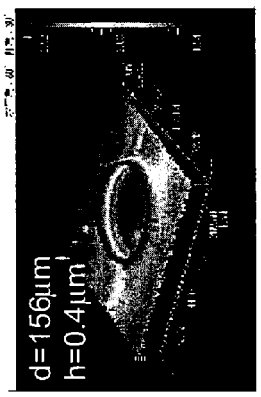 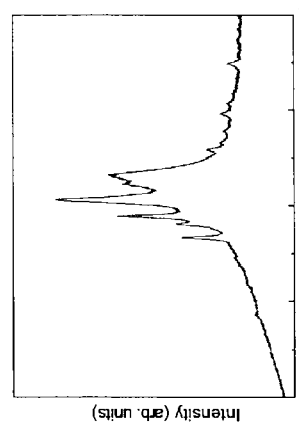
Heat Treatment 773K    Heat Treatment 823K    Heat Treatment 873K
(a)    (b)    (e)
X-ray Profile
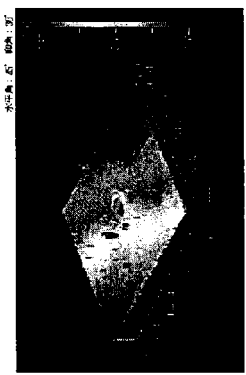 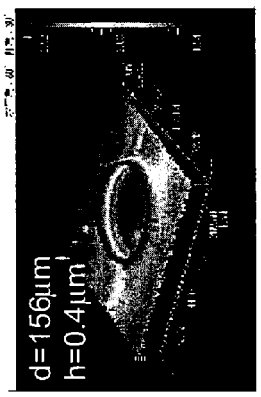 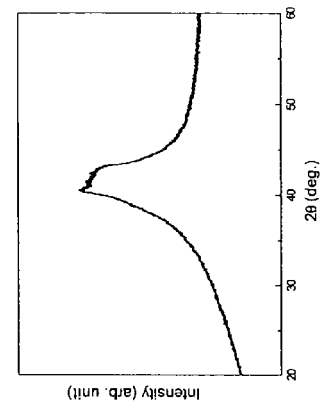
(b)    (d)    (f)

• Amorphous Phase.
⊗ Amorphous Phase.+Crystal Phase.
○ Crystal Phase.

• Amorphous Phase.
⊠ Amorphous Phase.+Crystal Phase.
○ Crystal Phase.

• Amorphous Phase.
⊠ Amorphous Phase.+Crystal Phase.
○ Crystal Phase.

FIG.25
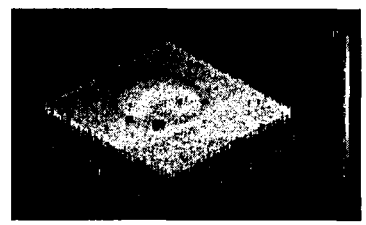
Indented trace size
650°C  φ81μm × 0.14μm
(a)
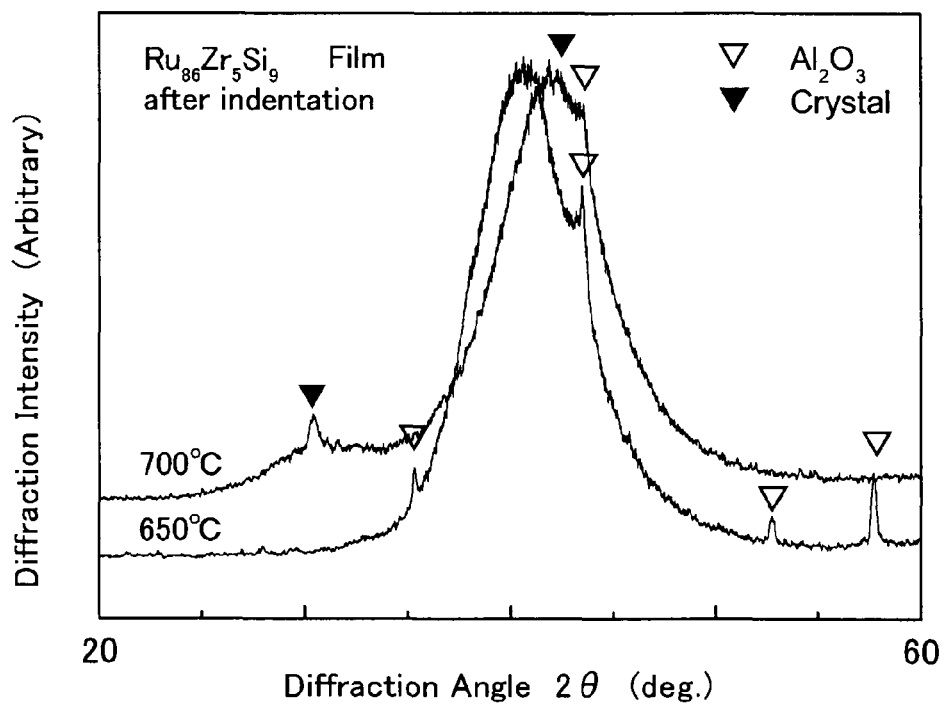
(b)

FIG.29
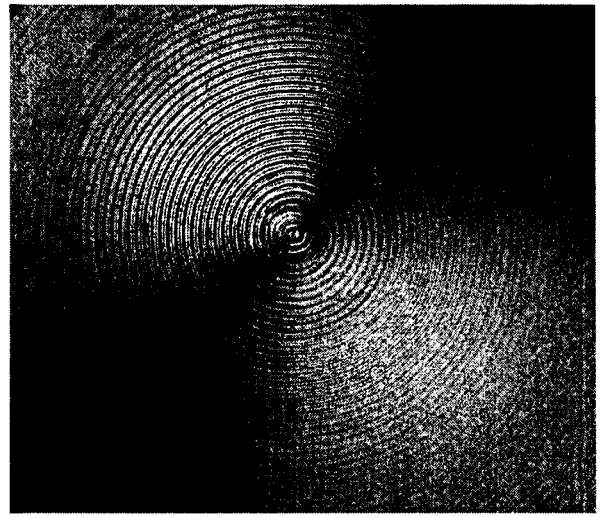
(a) Center
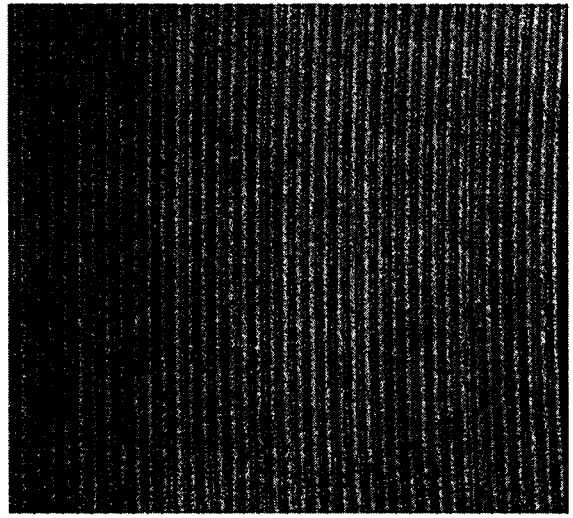
(b) Peripheral
(Optical Microscope Photographs (×..500))

CORROSION AND HEAT RESISTANT METAL ALLOY FOR MOLDING DIE AND A DIE THEREWITH

TECHNICAL FIELD

The present invention relates to a corrosion and heat resistant metal alloy and a molding die applying the metal alloy, and especially, the present invention relates to a heat and corrosion resistant metal alloy having excellent heat-resistant characteristics, machining characteristics, corrosion resistance and machining characteristics, and also having adhesion resistance to molten glasses of optical devices, suitable as die material for molding optical elements at high temperature and molding die applying the metal alloy.

BACKGROUND ART

A blue ray optical disk system has been developed as the next generation digital video disk (DVD) system. In the system, the recording capacity of an optical disk is 27 GB, which is a large increase in contrast to 4.7 GB of the conventional optical disk. In addition, there is a forecast for recording 50 GB or more by using a method of double layer recording. Since the large capacity of the blue ray system is realized by using a blue ray semiconductor laser, pick up objective lenses are required to focus the ray on a disk surface for reading and writing signals. There is a large difficulty in realizing the high quality objective lenses for focusing the blue ray using plastic material, because the lenses for focusing blue ray require quality several times higher than the objective lens quality for the conventional DVD system. In addition, the plastic lenses show focusing quality changes with temperature or environmental condition. Furthermore, the requirement for the blue ray optical disk system to satisfy compatibility with the conventional DVD systems makes the development of the optical system further difficult.

Since light sources used for the conventional DVD systems are red light semiconductor lasers, the optical system is required to operate to show high focusing performance for both red and blue ray of writing and reading of both conventional DVD signals and blue ray signals. To meet the requirement, for example, a method of using two lenses is known in which good performances are kept for both lights. In this method, a lens manufactured by a glass molding method is applied as the lens that contributes largely for focusing in combination with another plastic lens having diffraction grooves for changing its effect depending on the difference of the light sources. However, it is difficult to obtain high system performance using this method, because extremely high-speed driving performance is required for the objective lens.

Another method for realizing the objective lens is to form diffraction grooves on an aspherical glass lens for allowing functions of the plastic lens also. Then an objective lens that works as blue ray focusing lens compatible with the conventional DVD can be obtained by using a single glass lens having fine groove structure (Refer to Reference 1, for example).

The manufacturing of the glass lens in this type is desirable to be conducted by a molding method using a heat-resistant molding die to ensure its productivity. For this reason, it is a principal issue to develop a technology of forming a glass lens having fine structure using a heat resistant material. The molding die is needed to form a fine structure of diffraction grooves on the die surface for molding and transferring an optical surface to a molded glass lens.

Known dies for molding plastic molded lenses are fabricated by methods of forming electroless nickel plating on surfaces of blank die bases and cutting the plated surface by a diamond ultra-fine machine. However, this method takes process time of from several days to one week or two weeks for the plating to obtain plating layers without residual strains. Therefore, it takes several weeks for manufacturing one die in total including the ultra fine cutting process after the plating.

Inventors of the present invention already achieved development of a new technology that facilitates manufacturing these dies using amorphous metal alloys having metallic glass characteristics. The technology was realized by forming metallic glass layer on a surface of a blank die base by a sputtering method instead of using electroless plating process and then ultra-fine cutting is applied. This technology uses the characteristics of metallic glass having crystallization temperature $T_x$ and glass transition temperature Tg that softens like thick malt syrup at super-cooled liquid state at temperature range between Tx and $T_g$. Then, molded dies are manufactured by applying the molding process using a mother die. The dies manufactured by this molding process are named as "cloned dies". Application of the dies improved product accuracy and quality, in addition to reducing manufacturing process time (References 2 and 3). Applying this method, fine structures such as diffraction grooves can precisely be formed on a replicated optical surface. Due to the amorphous structure of the alloy, the alloy has characteristics not found for conventional metallic material such as an excellent cutting performance permitting formation of fine structure and so on in addition to microscopic homogeneity of composition, large mechanical strength and chemical stability. These characteristics are advantageous to obtain the die characteristics required for high precision molding.

To apply the manufacturing technology of molding dies using amorphous metal alloy thin film that is successful for molding plastic lens to the technology of molding dies for manufacturing glass lenses, following big technical problem must be solved. In contrast to the molding temperature of plastic lenses of about 200 degrees centigrade, the temperature of molding glass lens is higher temperature of about 500 degrees centigrade even when the $T_g$ of the glass material is low. The temperature is 800 degrees centigrade or more when the $T_g$ of the glass material is high. Therefore, the thin film metallic glasses used successfully for molding plastic lenses cannot be applied for dies of molding glass lenses. Therefore, a new metallic die material applicable in such a temperature range is required. Furthermore, the die material is essentially required to be resistant to bonding formation with glass material. It must be noted that glass material for lens application is generally reactive to die material and easily form fusion bond with a molding die.

The problem is not limited to the problem of amorphous metal alloy but also problems for using nickel plating to molding dies of conventional plastic glass molding. Dies plated with nickel cannot be used as dies for molding glass lenses. For this reason, hard metal having heat-resistant characteristics and resistant to bonding to glass is applied as die for molding glass lenses. However, there are big disadvantages of the hard metal material of extremely hard for machining, and requiring much time and cost for machining. The hard metal material is not suited for forming fine structure because a machining process by grinder must be applied as cutting process, and so the hard metal material is very difficult to form fine structure such as diffraction groves on optical surface of the die.

For this reason, it is desirable as a resolution of the issues explained above to find out amorphous metal alloy material, and especially to find out metallic glass film material that softens like thick malt syrup at super-cooled liquid state between $T_x$ and $T_g$ as a molding die material for realizing die for molded glass lens. Then, the amorphous metal alloy applying to a die for molding glass lens is required to have $T_g$ at least at 600 degrees centigrade or more.

Therefore, metallic glass having $T_x$ and $T_g$ at high temperature range is required. Examples of known metallic glass having $T_x$ and $T_g$ at high temperature range are as follows.

Metallic glass of amorphous Fe alloys that are prepared as bulk metallic glass other than prepared as thin film plate or film and available as magnetic materials are described in patent literature 4. In this literature, amorphous Fe alloys containing semi metal elements P, C, B, Ge and so on, and metal elements Al, Ga, Sn and so on having temperature interval $\Delta T$ (where $\Delta T = T_x - T_g$) of 40 K or more are disclosed. $T_g$ values of these amorphous alloys are between 500 to 600 degrees centigrade.

In patent literature 5, amorphous Fe alloys expressed by $Fe_{100-x-y}M_xB_y$ where M=Zr, Nb, Ta, Hf, Mo, Ti, V or Cr having temperature interval of 20 K or more are disclosed. $T_x$ values of these amorphous alloys are 500 to 600 degrees centigrade.

In patent literature 6, soft magnetic amorphous Co alloys having super-cooled liquid temperature interval $\Delta T$ of 40 K or more, a reduced glass transition temperature $T_g/T_x$ of 0.59 and low coercive force of 2.0 A/m are disclosed. These amorphous alloys are expressed by $[Co_{1-n-(a+b)}Fe_nB_aSi_b]_{100-x}M_x$, where M is at least one of Zr, Nb, Ta, Hf, Mo, Ti, V, Cr, Pd or W. The $T_x$ values of these amorphous alloys disclosed in the literature are 640 degrees centigrade or less.

Although metallic glassy state is obtained by heating these amorphous alloys, they do not have resistance to bonding formation with glass at the process of molding, corrosion resistance and heat all together. Therefore, it is needed to obtain a novel alloy material suitable to this purpose having resistance to bonding formation against glass material in the process of molding, corrosion resistance and heat resistance to realize a die for fine molding of the glass lenses explained above.

Pt metal has both excellent corrosion resistance and excellent heat stability, but hardness of Pt metal is not so large. Therefore, it is desirable to obtain Pt amorphous alloy having large hardness maintaining its machining characteristics.

Amorphous alloys having compositions of $(Pt_{1-x}Ni_x)_{75}P_{25}$ such as Pt60Ni15P25 are reported (non-patent literature 1). Although the alloys are Pt alloys and show properties suggesting metallic glassy state, the $(Pt_{1-x}Ni_x)_{75}P_{25}$ alloys have a problem in chemical stability because the alloys contain P. Noble metal base alloys of Pt—Cu—P alloys (where $50 \leq Pt \leq 75$, $5 \leq Cu \leq 35$, and $15 \leq P \leq 25$) are disclosed (Reference 6). These alloys also have a problem in chemical stability despite that the alloys are Pt alloys. As other Pt alloys that show metallic glassy state, Pt alloys having $Pt_{20}Zr_{80}$ and $Pt_{20}Zr_{70}Ni_{10}$ compositions are reported (non-patent literature 2). However, these alloys have a problem of low heat resistance because $T_g$ values of these alloys are low.

As explained above, none of the known Pt alloys fit to material of die for high precision molding of glass lenses and so on. These results dismiss the possibility of applying the alloys as alloy material of the die for fine molding of the glass lenses and so on.

[Reference 1] JP-A 2005-209321 (KOKAI)
[Reference 2] JP-A 2003-154529 (KOKAI)
[Reference 3] JP-A 2003-160343 (KOKAI)
[Reference 4] JP-A H08-333660 (KOKAI)
[Reference 5] JP-A 2000-256812 (KOKAI)
[Reference 6] JP-A 2003-301247 (KOKAI)
[Reference 7] JP-A 2002-53918 (KOKAI)
[Non-Patent Literature 1] Journal of Non-crystalline Solids: Vol. 18, p. 157 (1975)
[Non-Patent Literature 2] 644th Materials Research Symposium Proceedings L.1.1, p. 1 (2001)

DISCLOSURE OF THE INVENTION

The Problem to be Solved by the Invention

Known amorphous alloys explained above are developed for a purpose of obtaining properties of special purposes such as magnetic properties for example, and required characteristics of molding die such as corrosion resistance, stability to heat, resistance to bond formation with glass material, are not taken into the consideration. So, required characteristics of molding die such as stability to heat, oxidation resistance, and resistance to bond formation with glass material are not ensured for these amorphous alloys. For example, diamond cutting cannot apply to Fe based metallic glass alloys disclosed in patent literature 4 and 5, because these alloys are chemically reactive. The known Co based metallic glass alloys disclosed in patent literature 6 are not suitable to the die for the glass lens molding for such reasons as lack of chemical stability, lack of heat stability or so on. The known Pt alloys are not applicable to the die for molding glass lenses because of the reasons of lacking chemical stability, heat resistance or so on.

Therefore, all the amorphous alloys explained above are inadequate to amorphous alloy material for applying to the die for molding glass optical lenses at high temperature.

A purpose of the present invention is to provide alloy having excellent workability, heat stability, corrosion resistance, and resistant to bonding to glass, suitable for use as material of die for molding such as optical glass devices at high temperature. Another purpose of the present invention is to provide a die for molding at high temperature such as optical glass devices.

Means for Solving the Problems

A corrosion and heat resistant alloy for molding die of the present invention is characterized by comprising at least one first element selected from the group consisting of Pt and Ru, at least one second element selected from the group consisting of Zr, Hf, Si, Ir, Ru, Pd and Ni, and at least one third element selected from the group consisting of Si, Cu, Cr, Fe, Mo, Co, Al, Zr, Hf, Ni and Ru, containing the first element the most and the third element the least of the first element, the second element and the third element and including amorphous phase.

Inventors of the present invention focused on high corrosion and heat-resistant characteristics of Pt metal at first, and after extensive research, they obtained Pt alloys having excellent workability, heat stability, corrosion resistance, resistant to bonding to glass and durability, and then they attained to make the present invention.

The Inventors focused also on Ru alloy for its potentiality of high corrosion and heat-resistant characteristics, and carried their research activities to develop Ru base amorphous alloy. They noted that researches on Ru alloy are not so many, and Ru metal is relatively inexpensive compared with Pt metal or Pd metal. So, they set a target of developing Ru alloy material desirable to the die for molding glass devices having excellent workability, heat stability, corrosion resistance, and resistant to bonding to glass. Ru has chemical characteristics similar to Pt. Amorphous alloy of Pt base such as Pt—Ni—P alloy is already known, but details of Ru alloy is not clear and Ru base amorphous alloy is not known yet. As a result of the research work, they found that amorphous alloy can be obtained by Ru base alloy. They also found that alloy having excellent workability, heat stability, corrosion resistance, resistant to bonding to glass and suitable to die for molding glass devices can be obtained by using Ru alloy. The Ru alloy in the present invention has advantage of material cost in addition to excellent characteristics of workability, heat stability, corrosion resistance, and resistant to bonding to glass.

The die for molding optical device of the present invention is characterized by comprising the alloy explained above at least a portion of the die surface. Optical devices can be molded at elevated molding temperature using the die for molding optical device of the present invention.

As a result of the present invention, amorphous alloy having excellent characteristics of workability, heat stability, corrosion resistance and resistant to bonding to glass is provided. Using this amorphous alloy, it became possible to obtain dies applicable for molding optical glass devices such as glass lenses having grooves. When the amorphous alloy has a character of metallic glass having super-cooled liquid state, die produced by molding process, named as "cloned die" can be obtained using a method of molding at the super-cooled liquid state. Then, the time and cost for manufacturing the die can be reduced to a large degree.

BRIEF DESCRIPTION OF THE DRAWING

FIG. 1 shows a schematic figure of an aspheric glass lens having diffraction grooves on the optical surface, where (a) is the plain view and (b) is the cross section view cut by a plane including optical axis.

FIG. 5 shows a layout of a cathodic arc plasma gun and a substrate of the combinatorial material experimental apparatus used in the embodiment by a schematic cutaway figure.

FIG. 18 shows the shape of indentation after an indenting test at 773 degrees centigrade (bumps with ring shape) (a), the result of X-ray diffraction measurement after an indenting test at 773 degrees centigrade (b), the shape of indentation after an indenting test at 873 degrees centigrade (bumps with ring shape) (c), the shape of indented trace after an indenting test at 873 degrees centigrade (bumps with ring shape) (d), the shape of indented trace after an indenting test at 893 degrees centigrade (bumps with ring shape) (e), and the result of X-ray diffraction measurement after the indenting test at 893 degrees centigrade (f) for Pt52Hf36Ni2 film deposited on an $Al_2O_3$ substrate by the sputtering method.

FIG. 25 shows the shape of indented trace after an indenting test at 650 degrees centigrade (bumps with ring shape) for $Ru_{86}Zr_5Si_9$ film deposited on an $Al_2O_3$ substrate by the sputtering method (a) and the result of X-ray diffraction measurement after an indenting test at 650 degrees centigrade for the $Ru_{86}Zr_5Si_9$ film (b).

FIG. 29 is a photograph showing a diffraction grating replicating surface of the manufactured die for molding glass optical devices.

BEST MODE FOR CARRYING OUT THE INVENTION

Figure 2:
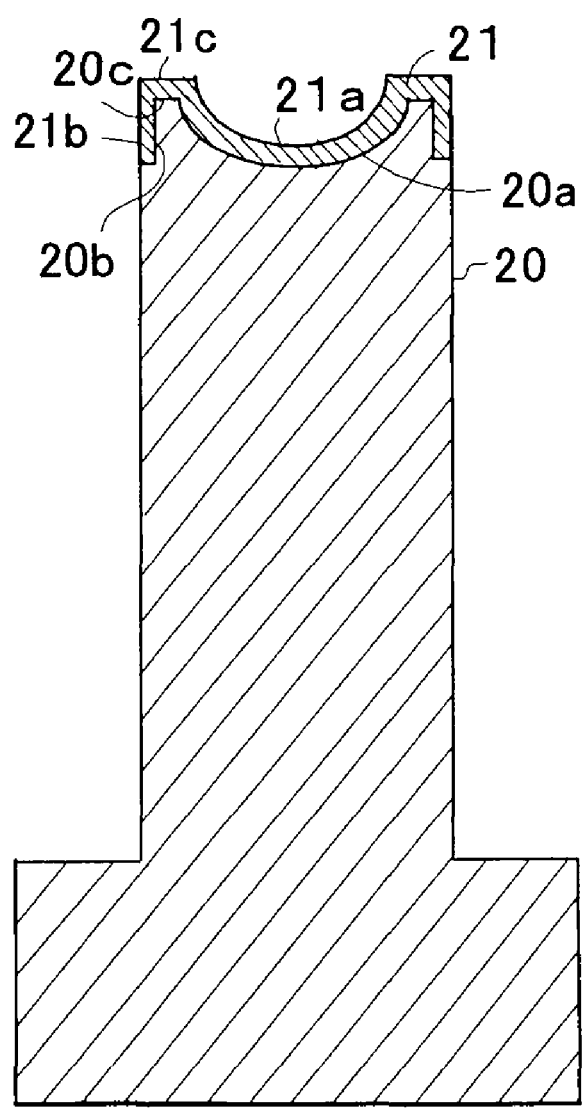
FIG. 2 shows a schematic cross section view of a molding die for molding the optical device shown in FIG. 1.

The present invention will be explained further in detail providing embodiment of the invention.

1) Alloy composition

Corrosion and heat resistant alloys for molding die according to the present invention can be alloys comprising Pt as the first element, at least one element selected from the group consisting of Zr, Hf, Si, Ir, Ru, Pd and Ni as the second element, and at least one element selected from the group consisting of Si, Cu, Cr, Fe, Mo, Co, Al, Zr, Hf, Ni and Ru as the third element, containing the first element the most and the third element the least of the first element, the second element and the third element. The alloys can be alloys comprising different second element and third element such as Pt—Zr—Si for example, and also can be alloys comprising the second and the third element such as Pt—Zr. Furthermore, the alloys can also be four component alloys such as Pt—Hf—Zr—Ni alloys.

Of these alloys, the alloys comprising Pt, at least a second element selected from the group consisting of Ir, Ru, Pd and Ni, and at least a third element selected from the group consisting of Si and Hf are especially desirable to secure every characteristics including ease of cutting, heat stability, corrosion resistance and resistant to bonding to glass.

When the corrosion and heat resistant alloy for molding die according to the present invention is Pt—Zr—Si alloys comprising Pt, Zr and Si as the components, the composition is desirable to be in a range containing more than 34 atomic percent and less than 93 atomic percent of Pt, more than 5 atomic percent and less than 60 atomic percent of Zr, and more than 0 atomic percent and less than 60 atomic percent of Si, containing Pt the most and Si the least of Pt, Zr and Si including amorphous phase.

The Pt content of these alloys is desirable to be more than 34 atomic percent. When the Pt content is 34 atomic percent or less, corrosion resistance of the alloy declines. For the same reason, containing Pt more than 50 atomic percent is further desirable. When the Pt content of is 93 atomic percent or more, the alloy turns to show crystal phase and cannot maintain amorphous phase.

Since Zr contributes to the amorphous phase formation in this alloy system, the Zr content is desirable to be at least more than 5 atomic percent. On the other hand, when the Zr content is contained more than 60 atomic percent, undesirable properties such as too large hardness for machining appear. For the same reason, the Zr content is further desirable to be contained less than 50 atomic percent.

The effect of amorphous phase stabilization is obtained by containing Si in the alloy. In order to bring out the effect, the Si content is desirable to be at least more than O atomic percent, and is more desirable to be at least more than 0.5 atomic percent. On the other hand, crystallization appears when the Si content is 60 atomic percent or more. For this reason, the Si content is further desirable to be less than 25 atomic percent.

When the corrosion and heat resistant alloys for molding die according to the present invention are Pt—Zr—Co alloys comprising Pt, Zr and Co as the components, the composition is desirable to be in a range containing more than 34 atomic percent and less than 93 atomic percent of Pt, more than 5 atomic percent and less than 60 atomic percent of Zr, and more than 0 atomic percent and less than 60 atomic percent of Co containing Pt the most and Co the least of Pt, Zr and Co and including amorphous phase for the same reason explained above. The Co content is further desirable to be more than 0.1 atomic percent.

When the corrosion and heat resistant alloys for molding die according to the present invention are Pt—Zr—Fe alloys comprising Pt, Zr and Fe as the components, the composition is desirable to be in a range containing more than 34 atomic percent and less than 93 atomic percent of Pt, more than 5 atomic percent and less than 60 atomic percent of Zr, and more than 0 atomic percent and less than 60 atomic percent of Fe containing Pt the most and Fe the least of Pt, Zr and Fe and including amorphous phase for the same reason explained above. The Fe content is further desirable to be more than 0.1 atomic percent.

When the corrosion and heat resistant alloys for molding die according to the present invention are Pt—Si—Al alloys comprising Pt, Si and Al as the components, the composition is desirable to be in a range containing more than 34 atomic percent and less than 93 atomic percent of Pt, more than 5 atomic percent and less than 60 atomic percent of Si, and more than 0 atomic percent and less than 60 atomic percent of Al containing Pt the most and Al the least of Pt, Si and Al and including amorphous phase for the same reason explained above.

When the corrosion and heat resistant alloys for molding die according to the present invention are Pt—Si—Ni alloys comprising Pt, Si and Ni as the components, the composition is desirable to be in a range containing more than 34 atomic percent and less than 93 atomic percent of Pt, more than 5 atomic percent and less than 60 atomic percent of Si, and more than 0 atomic percent and less than 60 atomic percent of Ni containing Pt the most and Ni the least of Pt, Si and Ni and including amorphous phase for the same reason explained above. The Ni content is further desirable to be more than 0.1 atomic percent.

When the corrosion and heat resistant alloys for molding die according to the present invention are Pt—Si—Ru alloys comprising Pt, Si and Ru as the components, the composition is desirable to be in a range containing more than 34 atomic percent and less than 93 atomic percent of Pt, more than 5 atomic percent and less than 60 atomic percent of Si, and more than 0 atomic percent and less than 60 atomic percent of Ru containing Pt the most and Ru the least of Pt, Si and Ru and including amorphous phase for the same reason explained above. The Ru content is further desirable to be more than 0.1 atomic percent.

When the corrosion and heat resistant alloys for molding die according to the present invention are Pt—Hf—Ni alloys comprising Pt, Hf and Ni as the components, the composition is desirable to be in a range containing more than 34 atomic percent and less than 93 atomic percent of Pt, more than 5 atomic percent and less than 60 atomic percent of Hf, and more than 0 atomic percent and less than 60 atomic percent of Ni containing Pt the most and Ni the least of Pt, Hf and Ni and including amorphous phase for the same reason explained above. The Ru content is further desirable to be more than 0.1 atomic percent.

When the corrosion and heat resistant alloys for molding die according to the present invention are Pt—Hf—Ru alloys comprising Pt, Hf and Ru as the components, the composition is desirable to be in a range containing more than 34 atomic percent and less than 93 atomic percent of Pt, more than 5 atomic percent and less than 60 atomic percent of Hf, and more than 0 atomic percent and less than 60 atomic percent of Ru containing Pt the most and Ni the least of Pt, Hf and Ni and including amorphous phase for the same reason explained above. The Ru content is further desirable to be more than 0.1 atomic percent.

When the corrosion and heat resistant alloys for molding die according to the present invention are Pt—Ir—Ru alloys comprising Pt, Ir and Ru as the components, the composition is desirable to be in a range containing more than 34 atomic percent and less than 93 atomic percent of Pt, more than 5 atomic percent and less than 60 atomic percent of Ir, and more than 0 atomic percent and less than 60 atomic percent of Ru containing Pt the most and Ru the least of Pt, Ir and Ru and including amorphous phase for the same reason explained above. The Ru content is further desirable to be more than 0.1 atomic percent.

The corrosion and heat resistant alloys for molding die according to the present invention can be characterized by alloys comprising Pt, at least one element consist of Ir, Ru, Pd, and Ni, and at least one element consist of Si and Hf, containing Pt the most and at least one element consist of Si and Hf the least of these elements and including amorphous phase.

The alloy compositions explained above are cases of Pt base ternary alloys. The alloy compositions according to the present invention can contain elements other than the ternary compositions. When the elements other than the ternary compositions, the total of the first, the second and the third elements are 95 atomic percent or more is desirable.

The ruthenium containing alloys according to the present invention are realized comprising at least one element selected from the group consisting of Fe, Co, Mo and Al, in addition to Ru and at least one element selected from Zr and Hf. The ruthenium alloys according to the present invention can be realized also by the compositions containing elements of Ru, Si and at least one selected from Fe, Co, Mo, and Al. The ruthenium alloys here are alloys comprising Ru with these elements as majority constituents, and the alloys can be crystalline, amorphous, or mixed phase of crystalline and amorphous without making any classification of their structure.

When the ruthenium containing alloys are Ru—Zr—Fe ternary alloys, the alloy composition is desirable to contain more than 10 atomic percent and less than 83 atomic percent of Ru, more than 4 atomic percent and less than 67 atomic percent of Zr, and more than 7 atomic percent and less than 64 atomic percent of Fe, containing Pt the most and Fe the least of Pt, Zr and Fe, in order to obtain heat resistant amorphous alloy phase. When the Ru content is below the range shown above, resistance to heat is insufficient. When the Ru content is over the range shown above, crystalline phase appears. Zr atoms contained in this content range contribute to form amorphous alloy phase. When the Zr content is less than this content range, the content is insufficient for forming amorphous alloy phase, and when the Zt content is more than the content range, the alloys show a crystalline phase. Fe atoms stabilize amorphous phase. When the Fe content is less than this content range, the content is insufficient for forming amorphous alloy phase. When the content is more than the content range, the alloys show a crystalline phase.

When the heat resistant amorphous alloys have Ru—Zr—Co ternary composition, the composition is desirable to contain more than 10 atomic percent and less than 83 atomic percent of Ru, more than 4 atomic percent and less than 67 atomic percent of Zr, and more than 7 atomic percent and less than 64 atomic percent of Co, containing Ru the most and Co the least of Ru, Zr and Co, for the same reason explained above in order to obtain heat resistant amorphous alloy.

When the heat resistant amorphous alloys have Ru—Zr—Mo ternary composition, the composition is desirable to contain more than 3 atomic percent and less than 60 atomic percent of Ru, more than 5 atomic percent and less than 75 atomic percent of Zr, and more than 15 atomic percent and less than 55 atomic percent of Mo, containing Ru the most and Mo the least of Ru, Zr and Mo, for the same reason explained above in order to obtain heat resistant amorphous alloy.

When the heat resistant amorphous alloys have Ru—Zr—Si ternary composition, the composition is desirable to contain more than 50 atomic percent and less than 100 atomic percent of Ru, less than 50 atomic percent of Zr, and less than 50 atomic percent of Si for the same reason explained above in order to obtain heat resistant amorphous alloy containing Ru the most and Si the least of Ru, Zr and Si.

When the heat resistant amorphous alloys have Ru—Zr—Al ternary composition, the composition is desirable to contain more than 10 atomic percent and less than 45 atomic percent of Ru, more than 5 atomic percent and less than 75 atomic percent of Zr, and more than 15 atomic percent and less than 55 atomic percent of Al, or to contain more than 55 atomic percent and less than 90 atomic percent of Ru, more than 5 atomic percent and less than 40 atomic percent of Zr, and more than 0 atomic percent and less than 15 atomic percent of Al, containing Ru the most and Al the least of Ru, Zr and Al, for the same reason explained above in order to obtain heat resistant amorphous alloy.

The ruthenium alloys explained above are all ternary alloys. The ruthenium alloys according to the present invention, however, are not limited to the ternary compositions. The alloys can contain other remaining components, for example, Fe, Co, Si and Al as the third element in addition to Ru and Zr, provided that amorphous phase can be obtained. The Zr atoms in the alloys can be partially substituted by Hf atoms. As the elements that can be contained in the alloys, alkaline metal elements of Li, Na, K and Rb, alkaline earth elements of Be, Mg, Ca, Sr and Ba, all transition metal elements, all rare earth metal elements, 3B family (13 family) elements of B, Al, Ga, In and Tl, 4B family (14 family) elements of C, Ge, Sn, Pb, N, P, As, Sb and Bi of 5B family (15 family), chalcogen element of S, Se, Te and Po, and halogen element of F, Cl, Br, I and At can be cited. On the other hand, hydrogen and oxygen are elements undesirable for containing in the alloys.

2) Heat Resistant Molding Die

Embodiments of the heat resistant molding dies and their fabrication method according to the present invention are described.

FIG. 1 is a schematic figure of an aspheric glass lens having diffraction grooves on the optical surface. In the figure, (a) is the plain view and (b) is the cross section view cut by a plane including optical axis. The optical surface 12 of the aspheric glass lens has diffraction grooves 13. The diffraction grooves 13 on the optical surface 12 as a fine structure of the optical surface 12 makes the single glass lens possible to have a functions of objective lens that is compatible to a DVD objective lens.

FIG. 2 shows a schematic cross section view of a die for molding optical devices such as the glass lens. In the manufacturing the die shown in FIG. 2, a blank die base 20 is formed using raw material such as steel at first. The blank base material 20 can be steel, stainless steel, hard metal and so on. On the blank base 20, the hollow 20a corresponding to an optical surface (aspheric surface, for example) of an optical device, the peripheral surface 20b surrounding the hollow, and the edge surrounding surface 20c at the edge of the die base 20 are formed at the end (upper end of the die shown in FIG. 2) as a shape approximated to the molding die.

The size accuracy requirement for the hollow 20a, peripheral surface 20b and a edge surrounding surface 20c of the die base 20 depends on the thickness of the amorphous alloy film deposited to the surfaces. For example, when the thickness of the deposition is about 100 μm, the size accuracy of the base 20 is satisfied by ensuring the accuracy of about 10 to 20 μm.

The time for machining the blank die base 20 is about several tens minutes using such as NC lathe turning machine.

Physical vapor deposition (PVD) methods such as the sputtering method, evaporation and so on, or the chemical vapor deposition (CVD) method are applied for depositing amorphous alloy film on the hollow 20a, peripheral surface 20b and a edge surrounding surface 20c of the die base 20.

In general, the PVD method is disadvantageous for obtaining amorphous metal alloy, because the substrate temperature increases to a high temperature. However, the PVD method other than the CVD method can be applied to the amorphous alloys according to the present invention because the alloys have stability to heat. Applying the PVD method, the amorphous metal alloy film can be deposited easily, and the every PVD method of sputtering, ion plating, evaporation and so on can be applied. When the sputtering method is applied, the target material is not limited to materials with amorphous state, and amorphous film can be obtained by depositing constituent atoms in a required composition. The deposition rate is desirable to be from 0.2 μm/h to several tens μm/h.

When the deposited film thickness is large, there is some possibility of deviating the die shape deviation from the designed die shape for molding optical device caused by the amorphous metal alloy deposited out of the hollow 20a, peripheral surface 20b and a edge surrounding surface 20c. For this reason, masking the portions other than the portions intended to be deposited, or removing after deposition by using diamond cutting or grinding is required in some case. Since the amorphous metal alloy film 21 can easily be machined and the quantity of machining is very small, the machining process essentially does not lead an increase of man-hour or cost.

Then the surface of the amorphous meal alloy film 21 is finished to a required surface finish degree for replicating optical surface 21a (corresponding to the hollow 20a of the base 20) and surface for replicating geometrical size base level 21b (corresponding to the peripheral surface 20b of the base 20) by cutting using a diamond or a boron nitride tool, by a hot press molding or by combination of these processing to the amorphous metal alloy film 21. The diamond cutting can be performed such as turning ultra precise lathe with single crystal diamond tool. The processing method explained in JPA2003-62707 disclosed by present inventors is desirably applied for the cutting process of the die for molding optical devices.

3) Press Molding of Molding Die

Figure 3:
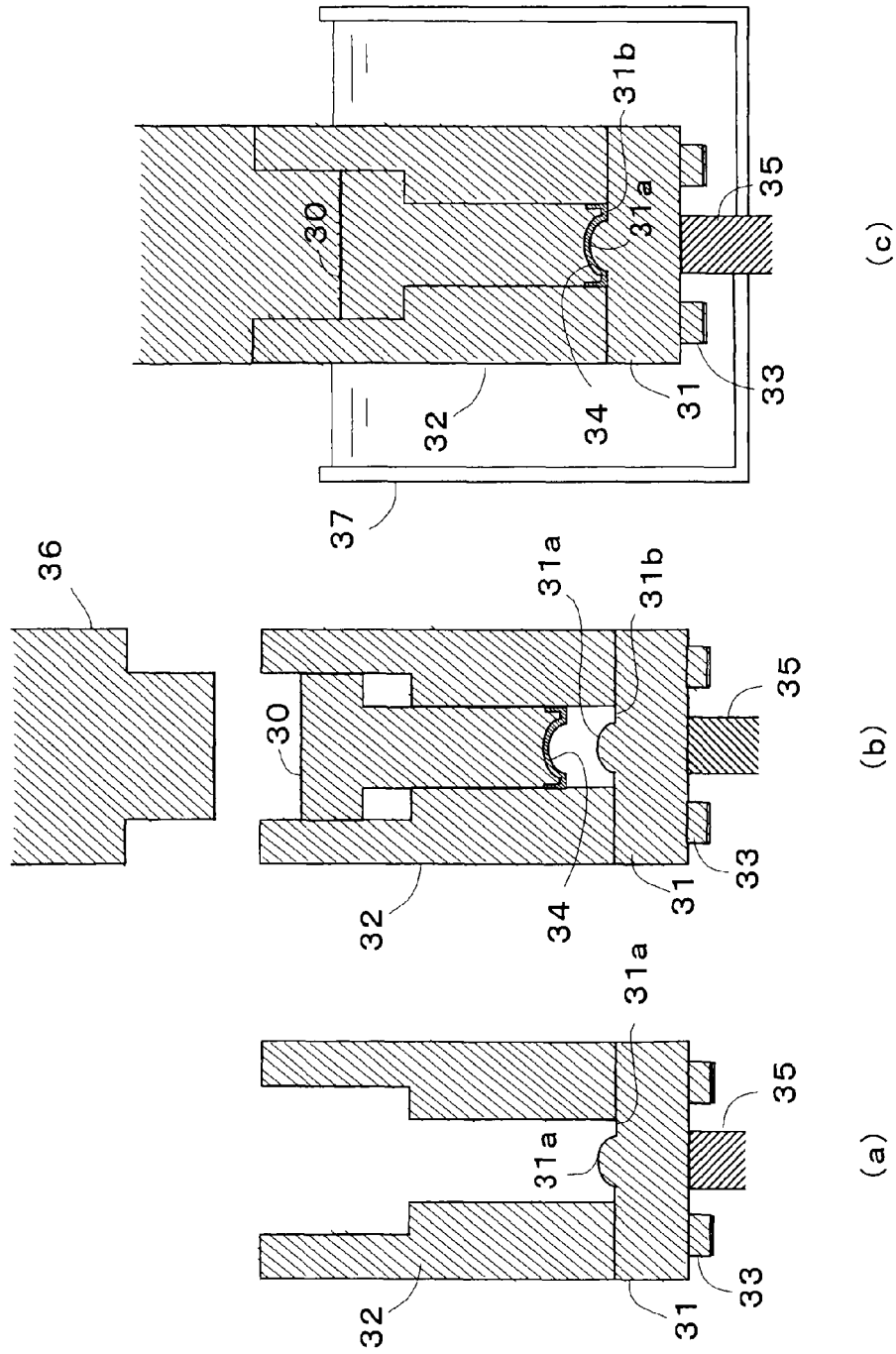
FIG. 3 shows a process of forming a surface for replicating optical surface and a surface for replicating geometrical size base level of a die for molding optical device with optical surface using hot press molding method.

FIG. 3 shows a process of forming a surface for replicating optical surface and surface for replicating geometrical size base level of a die for molding optical device having optical surface using a hot press molding method. First of all, a master die 34 is formed by fixing cylinder 32 using a bolt 33 on a master die 31 having mother optical surface 31a and mother surface of geometrical size base level 31b corresponding to the optical surface and surface of geometrical size base level. Then a support 35 is fixed to the die as shown in (a). Heating around mother optical surface 31a and mother surface of geometrical size base level 31b in advance by the heater placed around the master die 31 as shown in (b), the base 30 having deposited amorphous metal alloy film 34 (the film can be machined film) is inserted into the cylinder 32, and gives a pressure by using a plunger 36. Then, the air in the cylinder 32 flows out through an air vent (chase 32a) from the cylinder 32. When the heated amorphous metal alloy is metallic glass, a surface for replicating optical surface are formed as a result of flexible deformation similar to a molten resin such that the amorphous metal alloy film surface just fits to the mother optical surface 31a and mother surface of geometrical size base level 31b of die surface of a master die 31.

The amorphous alloy 34 is rapidly cooled by dipping the master die 31 and plunger 36 in a body in a vessel 37 as shown in FIG. 3. The body can be cooled naturally without using any artificial method. After that, separating master die 31 and plunger 36, the die for molding optical devices having surface for replicating optical surface corresponding to the mother optical surface 31a and mother surface of geometrical size base level 31b can be obtained. The process of heating, molding and cooling is desirable to perform in vacuum especially for forming a deeply hollowed optical surface, a complicated optical surface or forming on easily oxidized amorphous metal alloy by the hot pressing method.

4) Shape of Diffraction Rings

As an example of a device having highly functional fine stricture on the optical surface shaped using the molding die according to the present invention, aspheric lens having diffraction rings. The optical function of the aspheric surface is expressed by the following equation.

$$N = \text{INT}(Ah^2 + Bh^4 + C) \times (h, N)$$
$$= h^2 \Big/ \left(r_N\left(1 + \sqrt{1 - (1 + K_N)h^2/r_N^2}\right)\right) + A_{4N}^4 + A_{6N}^6 + A_{8N}^8 + A_{10N}^{10} + \Delta N$$

[Equation 1]

Where, N is ring number of the diffraction rings, h is the height from the optical axis, X is the distance from the tangential surface along the optical axis, $r_N$ is radius of curvature for Nth ring, $K_N$ is the cone coefficient for the Nth ring, from $A_{4N}$ to $A_{10N}$ are coefficient of asphericity, and $\Delta = -\lambda_0/(n-1)$ is surface shift value at the distance? 0 on the optical axis. This equation is shown in page 92 of "Introduction to Optical Devices" (published from Opt-electronics Co. This equation can express the saw-tooth wave shape of the cross section cut by a plane including the optical axis. Where, the $\lambda_0$ can be regarded as the wavelength of the formed diffraction rings. Other equations that can be used provided that the equations could express the surface shape of the diffraction surface of the optical device.

In general, the pitch of the diffraction rings (position of each ring) is defined using the phase difference function or the optical path difference function. Concretely, the phase difference function $\Phi b$ expressed by radian is shown by the following equation 2 and the optical path difference function $\Phi B$ expressed by mm is shown by the following equation 3.

$$\phi_b = \sum_{i=0}^{\infty} b_{2i} h^{2i}$$

[Equation 2]

$$\phi_B = \sum_{i=0}^{\infty} B_{2i} h^{2i}$$

[Equation 3]

These two expressions are equivalent for expressing a pitch of the diffraction rings, although difference of the units used for expressing these equations. Actually, multiplying $\lambda/2\pi$ to b of the phase difference function can be transformed into B to the blazed wavelength λ (expressed by mm), and in reverse the B of the optical path difference function can be transformed into b of the phase difference function by multiplying $2\pi/\lambda$.

For the purpose of simplifying the explanation, a diffraction lens using light after primary diffraction will be explained here. For the light path difference function, a ring is formed for the function value goes over every integer multiples of the blazed wavelengths λ. For the phase difference function, a ring is formed for the function value goes over every integer multiples of $2\pi$.

For a cylinder shaped lens having diffraction rings on both flat side surfaces of a cylinder having the blazed wavelength of 0.5 μm=0.0005 mm, for example, the coefficient of the quadratic term of −0.05 (transformed to coefficient of quadratic term of −628.3), and every other coefficient of other term is all zero, the radius of the first ring h is 0.1 mm and radius of the second ring is 0.141 mm. It is known that the focal distance f of the diffraction lens is $-i/(2B_2)$ of 10 mm for the quadratic term coefficient of the optical path difference function $B_2$ of −0.05.

Based on the definition explained above, a function is provided to the lens giving a non-zero value as the quadratic term coefficient of the phase difference function or the optical path difference function. Giving a non-zero value to other coefficients of higher order terms such as 4th, 6th power, 8th power, 10th power and 12th power term of the phase difference function or the optical path difference function, spherical aberration can be controlled. The control means controlling the spherical aberration to within a desirable value compensating the spherical aberration at a portion having a function of refraction by an opposite spherical aberration.

5) Glass Molding

Figure 4:
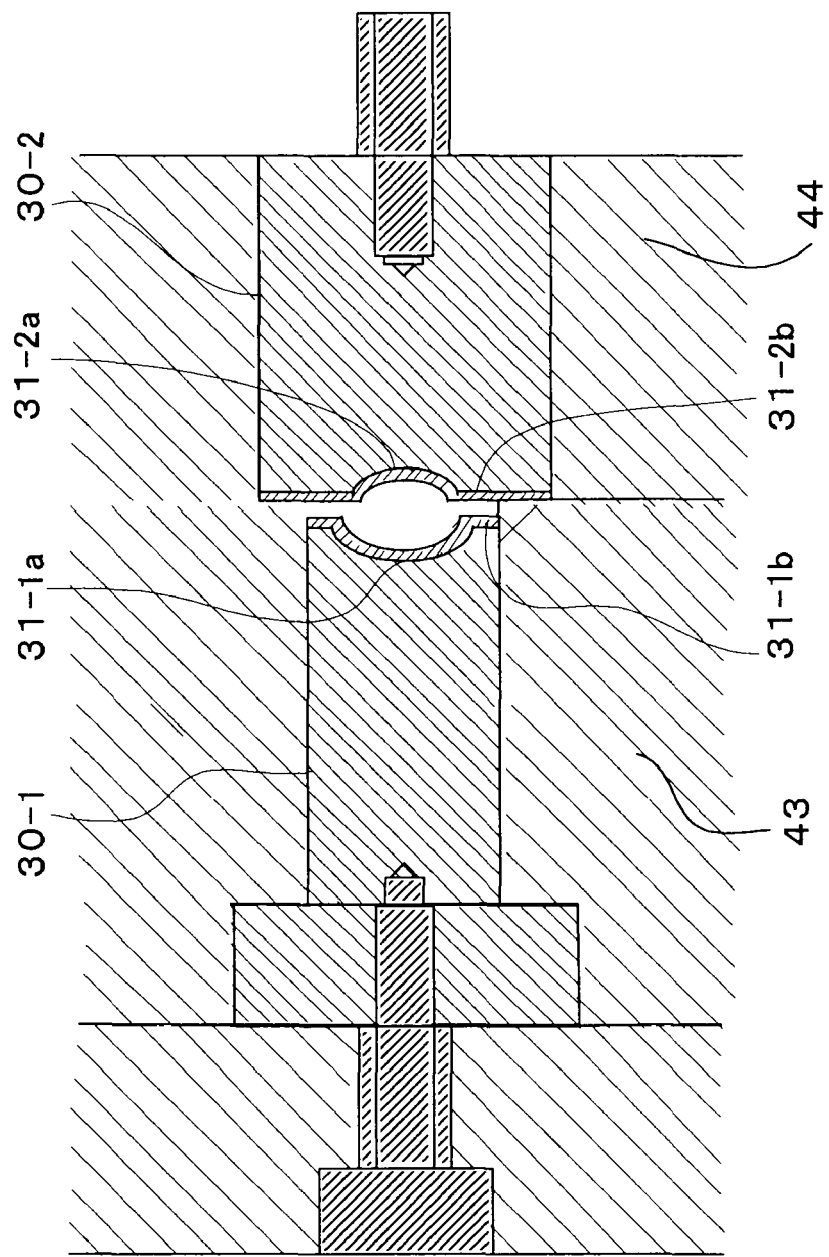
FIG. 4 shows a die set including a die for molding optical devices.

FIG. 4 shows a die set including a die for molding lenses and as examples of the optical devices. Amorphous metal alloy films as explained above are formed on the die for molding optical devices 31-1 having the surface for replicating optical surface 31-1a and the surface of geometrical size base level 31-1b, and on the die for molding optical devices 31-2 having the surface for replicating optical surface 31-2a and the surface of geometrical size base level 31-2b. The die for molding optical devices 31-1 and the die for molding optical devices 31-2 are inserted into die sets 43 and 44, facing surfaces of geometrical size base level 31-1a and 31-2a, and surfaces of geometrical size base level 31-1b and 31-2b.

The required molded lens can be obtained once separating the surfaces of 30-1 and 30-2, casting molten glass material on the die for molding optical devices 30-1, and pressing for molding using the die 30-2, and then cooling them.

The molding temperature is desirable in the temperature range of 300 degrees centigrade or more and 1500 degrees centigrade or less. When the temperature is less than 300 degrees centigrade, the temperature is below $T_g$ of the glass material for the optical device and flow characteristics is not sufficient for molding. When the molding temperature is more than 1500 degrees centigrade and more than 2000 degrees centigrade, there is an anxiety of chemical change of the glass material. More desirable temperature range is 400 degrees centigrade to 1000 degrees centigrade. In this temperature range, high durability of molding more than 1000 times can be attained.

The optical glass materials are oxides comprising Ti, Si, P, B, Ta, Li, Na, K, Rb, Cs, Mg, Ca, Sr, Ba, Bi, Zn, Al, Zr, La, Nb, Gd, F, Ga, Ge and so on. Especially, $SiO_2$, $P_2O_5$, and $B_2O_3$ are cited as primary constituent of the material. Alkaline elements of Li, Na, K, Rb or Cs are contained in order to decrease temperature of softening and to make formation of glassy state easier. Nb, Ba, La or Bi is contained in order to increase refractive index of glass material. Inclusion of P decreases and degrades weather durability, even if the refractive index of the glass decreases. Inclusion of Al or Zr improves weather durability in expense of increasing softening temperature. In order to decrease inclusion of gas foam, a small amount of Sb, As, Pb or Th can be added. Of these elements, Sb is desirable from the viewpoint of environmental protection requirement.

The present invention is explained more definitely showing examples.

EXAMPLE 1

Search of Pt Alloys Using the Combinatorial Method

To find out metallic alloy compositions that show amorphous phase, many samples having different compositions were prepared at once using a new material synthesizing apparatus disclosed in JP-A 2004-315939 (KOKAI) and combinatorial material evaluation substrate disclosed in JP-A 2005-131915 (KOKAI), and were evaluated.

<Combinatorial Material Experiment Apparatus>

The experimental apparatus is constructed mainly by discharge controlling unit, power supply, cathodic arc plasma gun (CAPG), stainless steel chamber of φ309 mm×396 mm, and vacuum evacuating system. FIG. 5 shows the layout of three CAPGs and a substrate of the apparatus using schematic cutaway figure.

In (a), (b) and (c) of FIG. 5, the first CAPG 51, the second CAPG 52 and the third CAPG 53 are disposed at each apex of regular triangle on a plane in the chamber 50. The dimensions of these cathodes are 10 mm in their diameters and 22.3 mm in their lengths. Substrate 54 is disposed down below the plane of these CAPGs. Samarium-cobalt magnet 55 having dimensions of 50 mm in diameter and 20 mm in length is disposed under the substrate. The maximum magnetic flux density of the magnet is 300 mT at the center of the surface and a magnetic circuit is formed such that the magnetic circuit is closed within the chamber. FIG. 5(a), (b) and (c) show a situation of ionized particles from CAPGs 51, 52 and 53 are led to the direction of the substrate, distributed and attached to the substrate. The position of the substrate is fixed at the center of the chamber. (In JP-A 2004-315939 (KOKAi), a case for moving a substrate is explained.) Films having ternary alloy composition system are formed in this way.

The interval of discharge is fixed to 1 minute and the capacity of the electric condenser is made variable from 2,200 mF to 8,800 mF (in 2,200 mF interval) in order to control the speed of the film deposition rate per one pulse discharge.

<Preparation of a Combinatorial Material Substrate>

On a substrate (3-inch $SiO_2$ substrate, 500 μm thickness), $Si_3N_4$ film having thickness of about 10 nm was formed, photo-resist (PMGI, supplied by KAYAKU MICROCHEM Co. Ltd.) was coated with a thickness of about 2 μm on the film using spin-coat method, and baked preliminarily.

Then Cu film of about 5 μm thickness was formed on the PMGI using RF the sputtering method.

(a) Patterning

Photo-resist (OFPR-800, supplied by Tokyo Ooka Industries Co.) was coated using a spin-coating method and baked preliminarily.

The total size and shape of the grid pattern is of a square form with side dimension of 39.6 mm×39.6 mm, and is able to take in 1,089 samples by 33 lines and 33 columns. The line width of the grid is 200 μm. The grid pattern was formed exposing light through photo-resist (OFPR-800) as a mask and developing using NMD-3. Furthermore, the Cu film etching using 38 atomic percent nitric acid water solution was conducted.

(b) Photo-Resist Development:

The photo-resist under the etched Cu layer was developed controlling the time of development to form T-top form (umbrella form) using NMD-3. Then the surface of the substrate was rinsed with pure water and dried using a blower.

<Sample Preparation>

Pt, Zr and Pt—Si are set as the three CAPG electrodes, respectively, and a film of Pt—Zr—Si alloys is deposited on the combinatorial substrate.

The condition of the preparation is as follows.

Basic pressure: $3.0 \times 10^{-5}$ Pa

Capacity of the condenser: 8,800 μF for Pt only, and 6,600 for Zr and Pt—Si.

Number of discharge: 36,400 in total composed of 26,000 for Pt, 7,800 for Zr, and 2,600 times for Pt—Si.

<Evaluation of Samples>

The sample composition ratios were determined by fluorescent X-ray measurement using energy dispersive X-ray spectrometer (EDX, mEDX-1200, Produce by Shimazu), and by a spectrum analysis applying a fundamental parameter (PM) method. Evaluation of crystallization was conducted using imaging plate (IP) X-ray diffraction apparatus (produced by Rint Rapid, Rigaku). Both the EDX and the IP X-ray diffraction apparatus can operate for multi-point automatic measurements and high-speed measurements using automatic X-Y stage.

Classification of sample portions into amorphous, crystalline, and transitional was performed using X-ray diffraction intensity distribution analysis. For the classification, the following standards are applied.

Amorphous portion: Line-width of the diffraction peak around 40 degrees is 5 degrees or more and no crystalline diffraction peak is found.

Transitional portion: Line-width of the diffraction peak around 40 degrees is 5 degrees or more and at least one crystalline diffraction peak is found.

Crystalline portion: Line-width of the diffraction peak around 40 degrees is 5 degrees or less.

Figure 6:
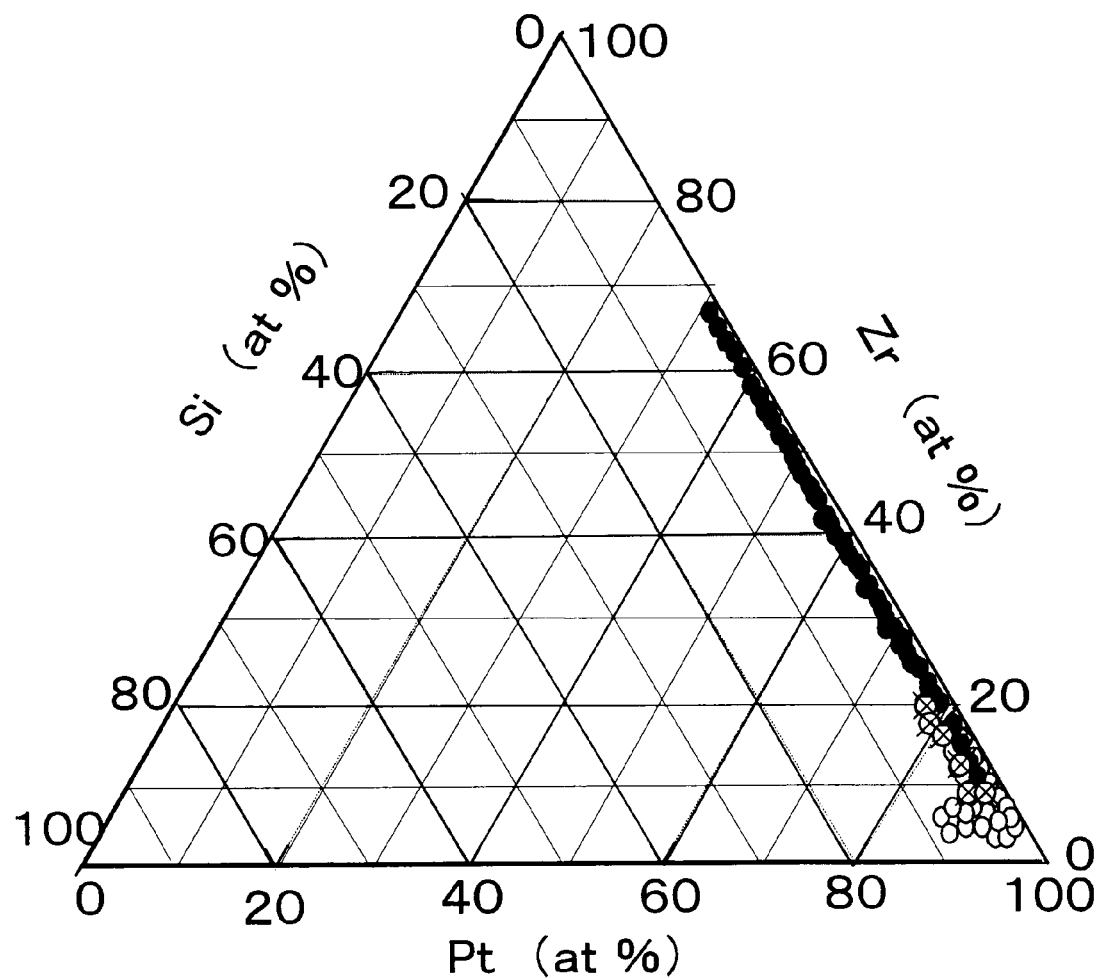
FIG. 6 shows the evaluation result of Pt—Zr—Si ternary alloy samples prepared using the combinatorial material experimental apparatus.

Results of the sample evaluation were shown in FIG. 6. In the figure, the determined sample compositions and the results of classification into amorphous, crystalline and transitional portions are plotted on the Pi—Zr—Si ternary phase diagram. In the figure, the desirable range according to the present invention is also shown. The descriptions of at % in the figure express atomic percent. Same descriptions found in FIG. 7 to FIG. 10 also express atomic percent.

Figure 7:
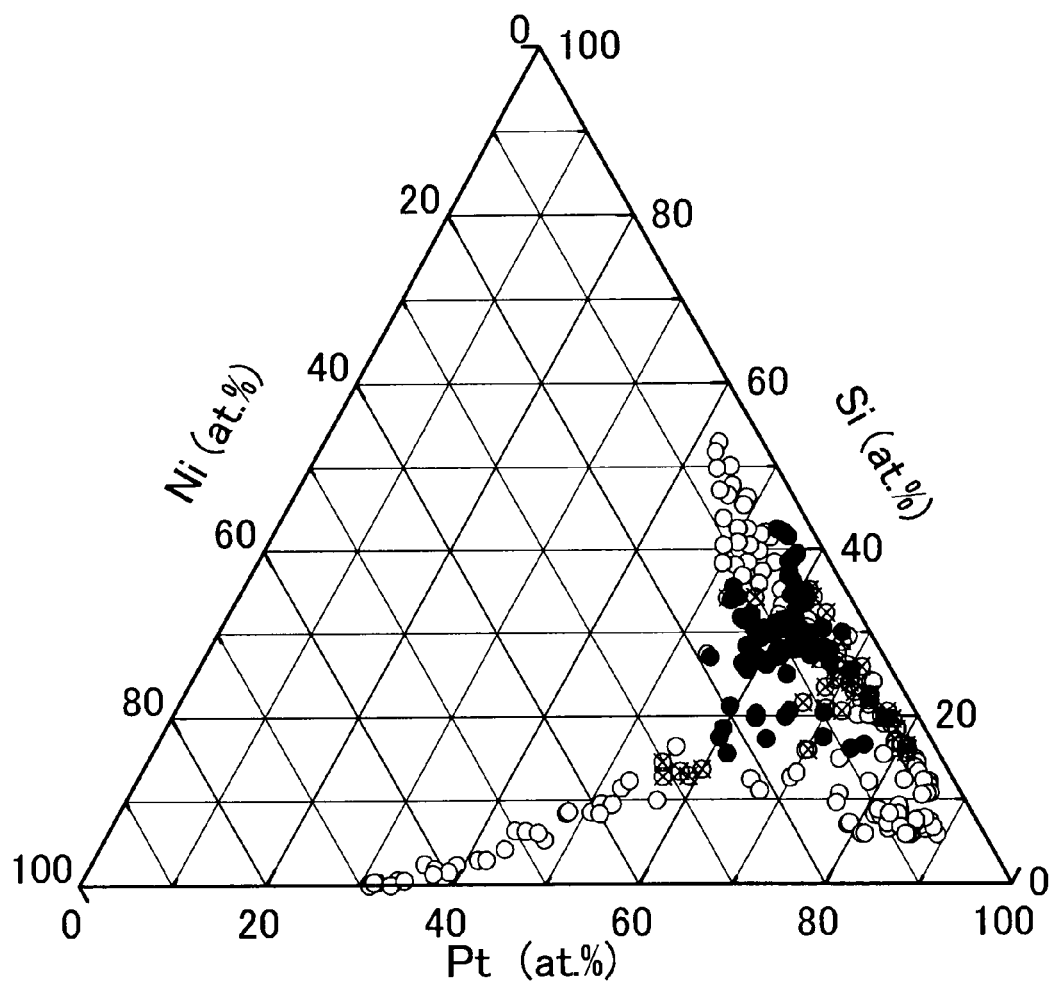
FIG. 7 shows the evaluation result of Pt—Si—Ni ternary alloy samples prepared using the combinatorial material experimental apparatus.
Figure 8:
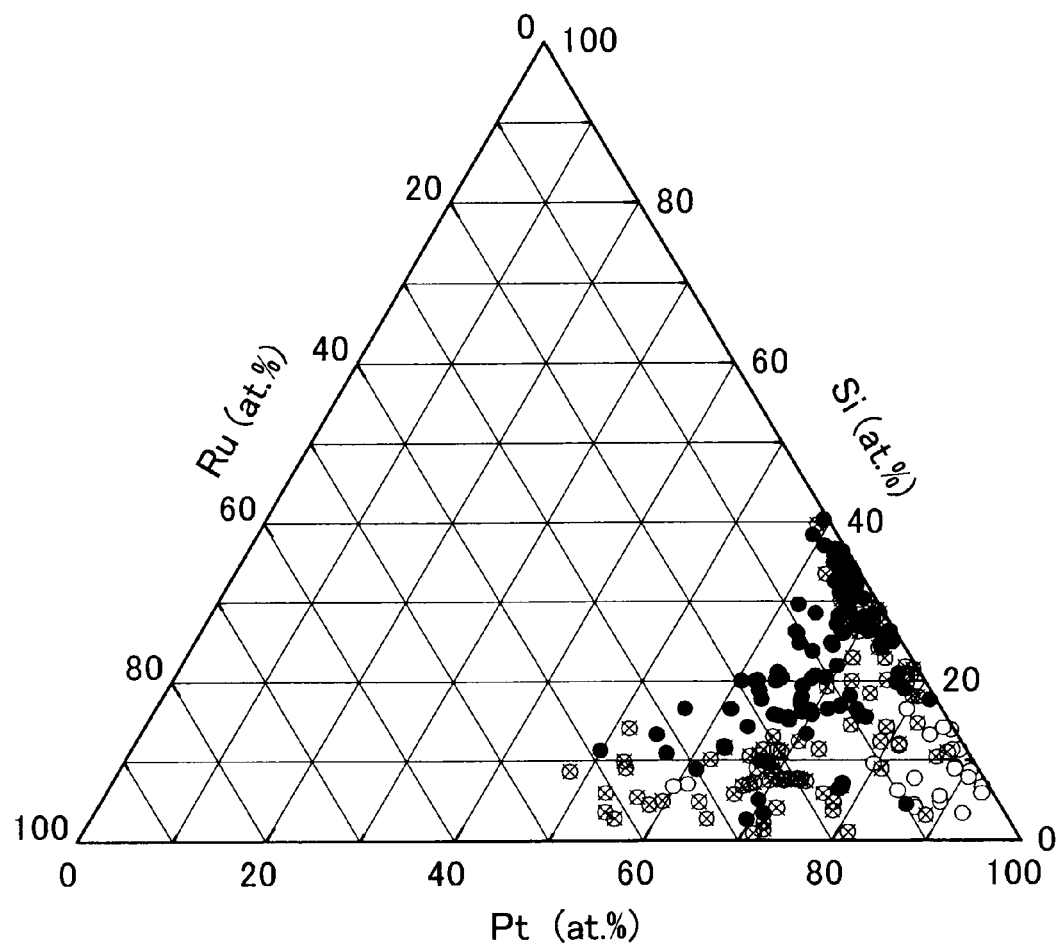
FIG. 8 shows the evaluation result of Pt—Si—Ru ternary alloy samples prepared using the combinatorial material experimental apparatus.
Figure 9:
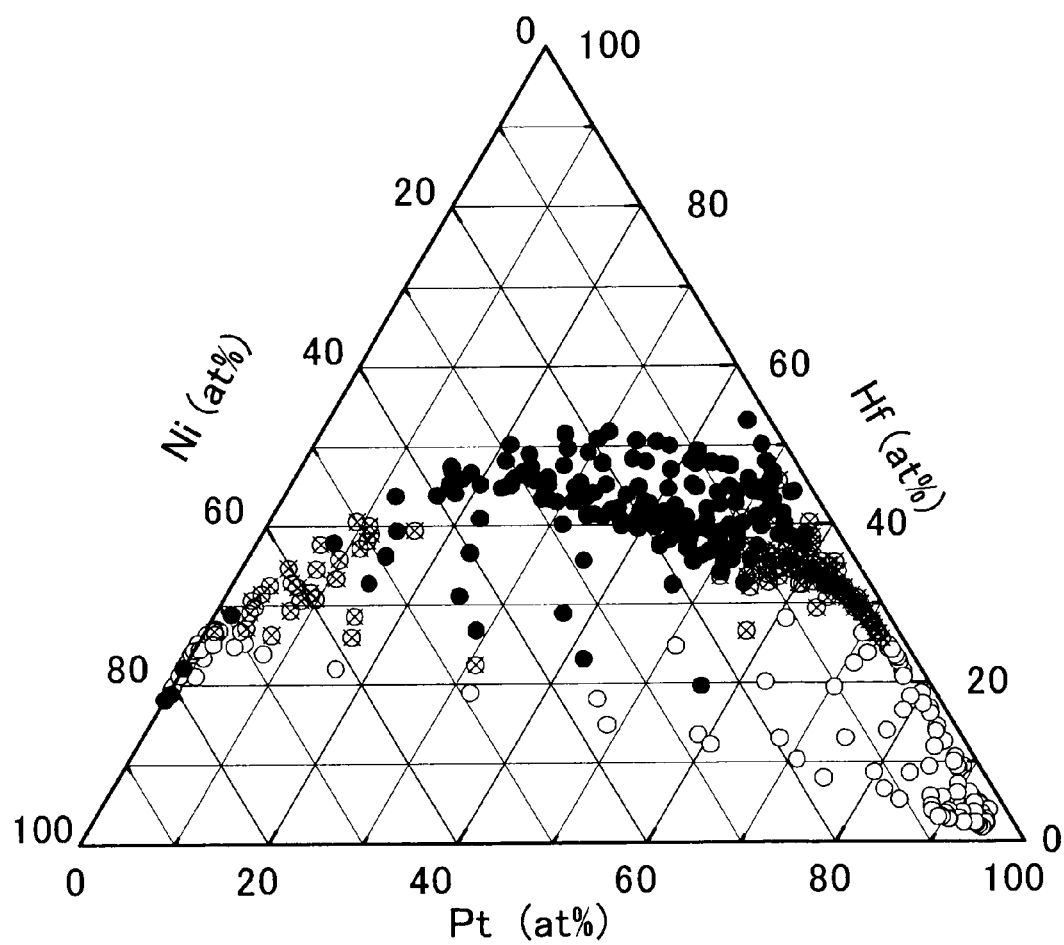
FIG. 9 shows the evaluation result of Pt—Hf—Ni ternary alloy samples prepared using the combinatorial material experimental apparatus.
Figure 10:
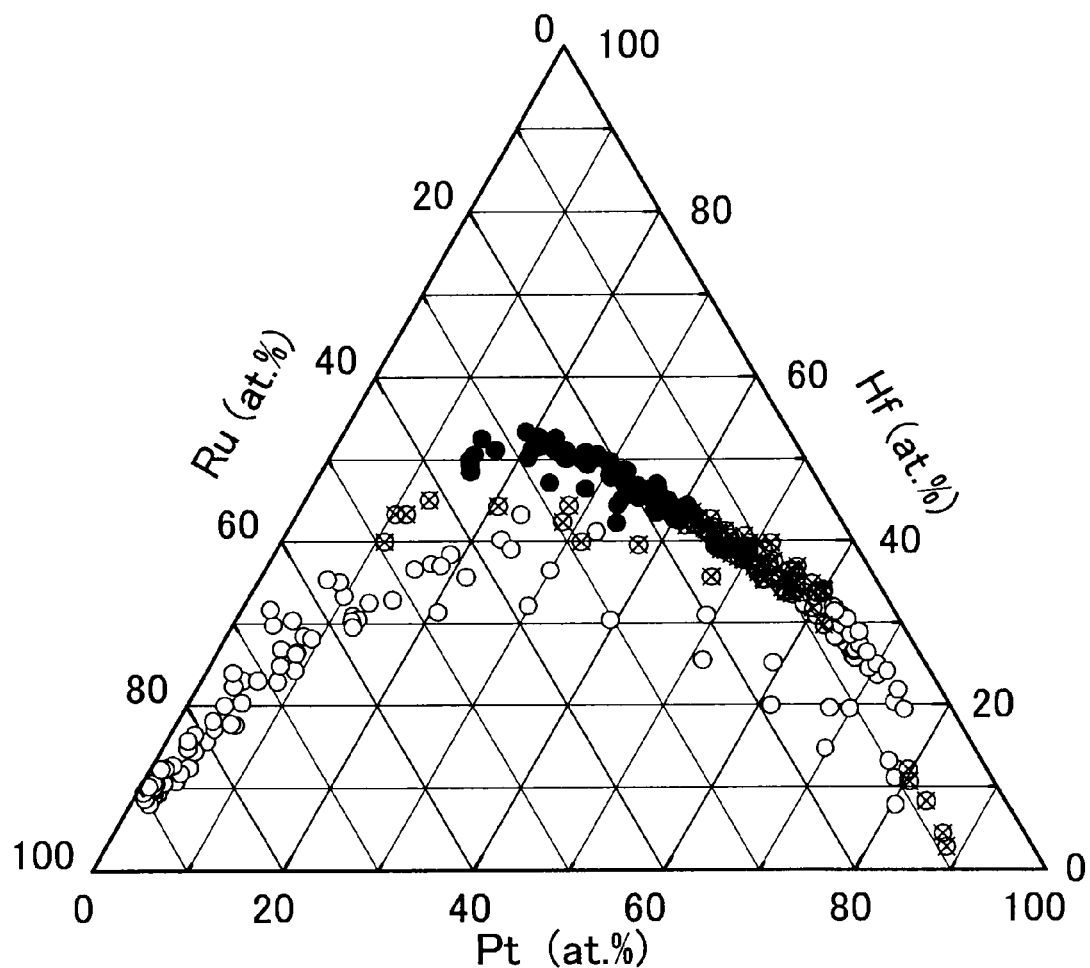
FIG. 10 shows the evaluation result of Pt—Hf—Ru ternary alloy samples prepared using the combinatorial material experimental apparatus.

Similar to the Pt—Zr—Si ternary system, samples of Pt—Si—Ni, Pt—Si—Ru, Pt—Hf—Ni and Pt—Hf—Ru ternary systems were prepared using the combinatorial experimental apparatus and confirmed that amorphous phase can be obtained for all of the three alloy systems after classifying phases into amorphous, crystalline or transitional. FIG. 7 shows the result of the classification for Pt—Si—Ni ternary system and FIG. 8 shows the result of the classification for Pt—Si—Ru ternary system. FIG. 9 shows the result of the classification for Pt—Hfi-Ni ternary system. Further, FIG. 10 shows the result of the classification for Pt—Hf—Ru ternary system. For Pt—Hf—Ru ternary system, no amorphous phase composition region was found at the Pt rich composition. For the remaining three alloy systems, amorphous phase composition region was found at each Pt rich composition. Signs suggesting undesirable mechanical properties such as cracks or peeling were not found from samples on the library.

EXAMPLE 2

Preparation and Evaluation of Pt Base Alloy Films

Films having the compositions of $Pt_{48}Hf_{37}Ni_{15}$ and $Pt_{45}Hf_{36}Ni_{19}$ were formed using the multi-source simultaneous sputtering apparatus. The crystallization temperature $T_x$ values of the films were evaluated using the X-ray diffraction method and the grass temperature $T_g$ values were evaluated using an indenting test method. Furthermore, measurement of tensile strength was conducted. From these results, it was found that the $Pt_{48}Hf_{37}Ni_{15}$ film has $T_x$ of about 700 degrees centigrade, and a dent formation due to the indenting test was observed showing an existence of metallic glassy state as the $T_g$ evaluation of the film. The tensile strength of the film was 0.30 Gpa. For the $Pt_{45}Hf_{36}Ni_{19}$ film, $T_x$ of about 550 degrees centigrade and a dent due to the indenting test was observed as the $T_g$ evaluation result confirming existence of a metallic glassy state. The tensile strength of the film was 0.37 Gpa.

Figure 11:
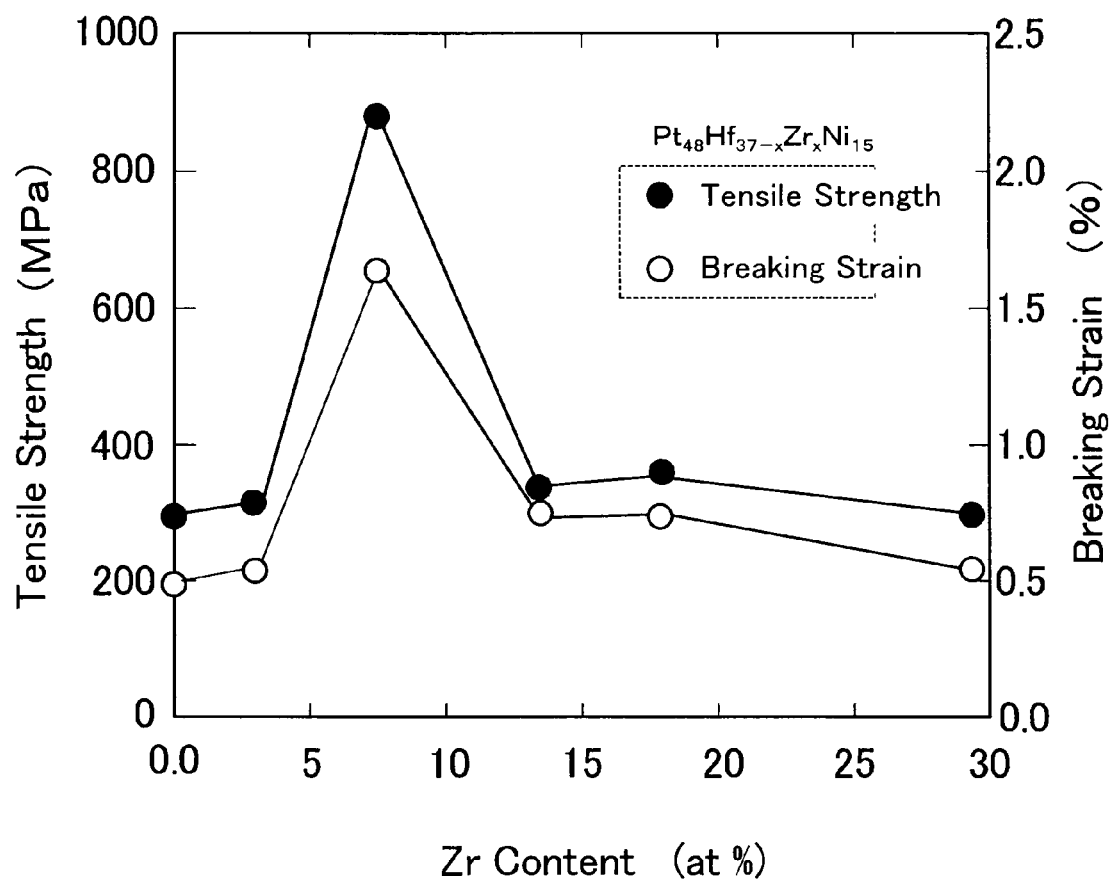
FIG. 11 shows the relation between Zr content and mechanical strength of Pt48Hf37-xZrxNi15 alloy.

In order to obtain increased mechanical strength for Pt—Hf—Ni ternary alloy system, a pseudo-ternary alloy system of Pt—(Hf,Zr)—Ni containing Zr having property similar to Hf was investigated. FIG. 11 shows the relation between the Zr content x and the mechanical strength for $Pt_{48}Hf_{37-x}Zr_xNi_{15}$ alloy system. From FIG. 11, the increase of the tensile-strength up to 0.9 Gpa and the fracture-strain up to 1.5 percent was confirmed when the Zr content is 7.5 atomic percent. From the result of X-ray diffraction at elevated temperature in vacuum, $Pt_{48}Hf_{22}Zr_{15}Ni_{15}$ alloy showing the highest tensile strength was confirmed to have $T_x$ of 700 degrees centigrade or more. The result of indenting test of the alloy showed that the dent confirming existence of $T_g$ was observed when the testing temperature was increased to 650 degrees centigrade or more.

Figure 12:
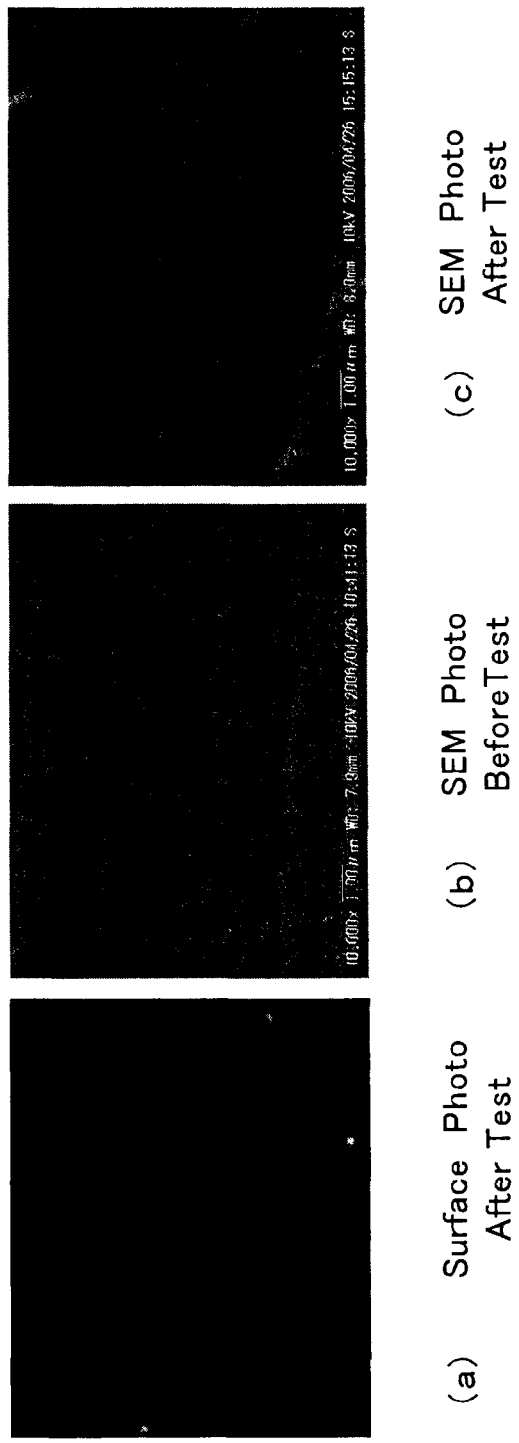
FIG. 12 shows a surface photograph of the alloy after glass material dropping test and scanning electron microscope photographs of the surface before and after the dropping test.

Test of adhesion resistance to molten glass was performed for the $Pt_{48}Hf_{22}Zr_{15}Ni_{15}$ film. The test method was as follows. On a surface of a metallic blank material (hard metal material, 10 mm in diameter and 5 mm in thickness), an alloy film of 5 μm thickness was formed by sputtering using the multi-source simultaneous sputtering method. After heating the film up to 480 degrees centigrade and keeping at the elevated temperature in air using a hot plate, a 300 mg fused glass droplets was fallen on the film for five times. Then, the change of the film surface and occurrence of crystallization were examined. FIG. 12 shows photograph of the sample surface after the test (a), and scanning electron microscope photographs before the test (b) and after the test (c). As the result, the Pt—Hf—Zr—Ni film surface did not have adhesion with glass and no trace of the glass droplet was found. Surface observation using scanning electron microscope was conducted and no peel and no crack were found on the surface. An X-ray diffraction measurement for the surface after the test was performed and no crystallization was found.

EXAMPLE 3

Pt—Ir—Zr Alloys

Figure 13:
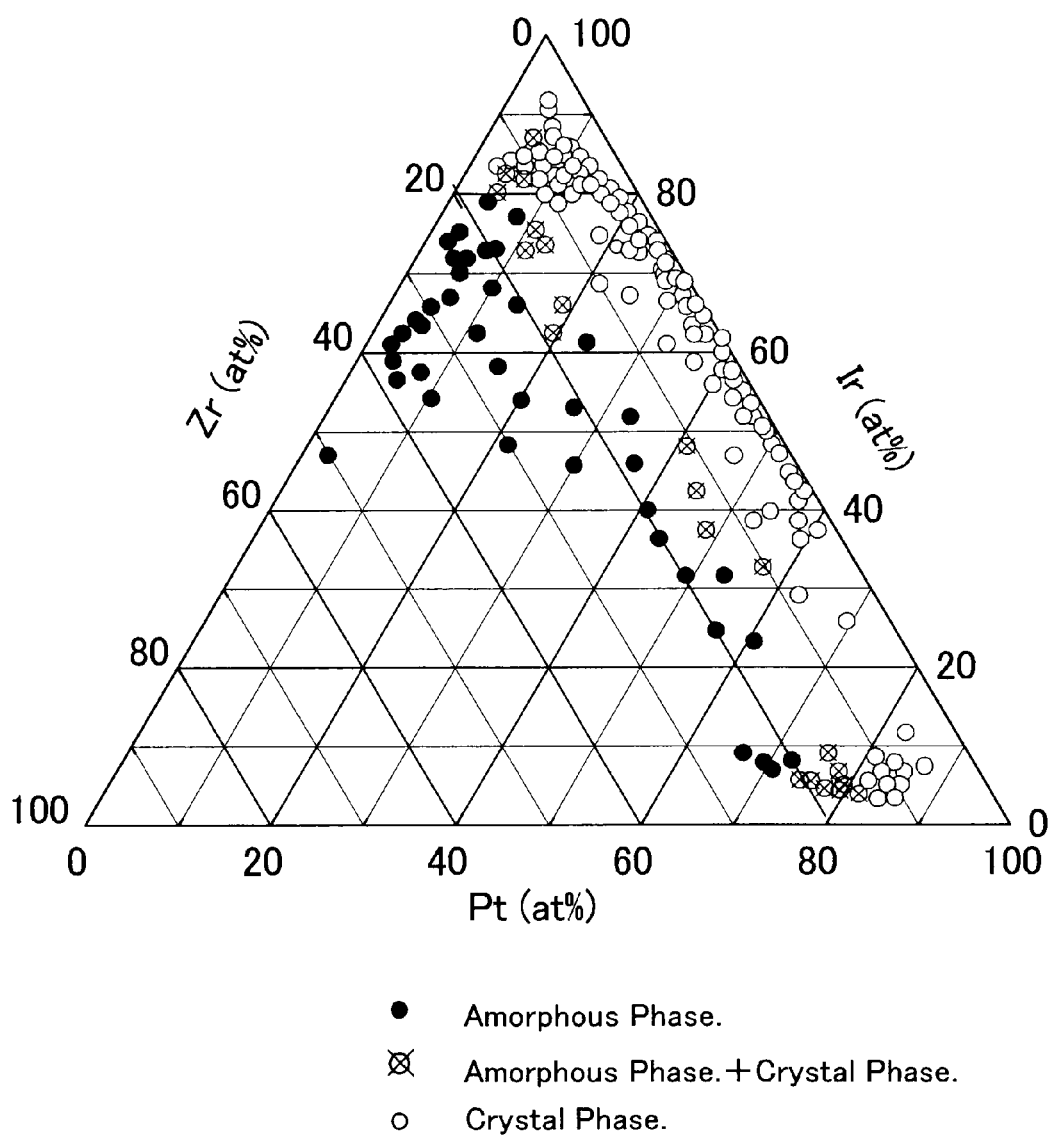
FIG. 13 shows the evaluation result of Pt—Ir—Zr ternary alloy samples prepared using the combinatorial material experimental apparatus.

To find material having higher strength and higher corrosion resistance, the composition range showing amorphous phase of Pt—Ir—Zr ternary alloy system containing Ir in Pt alloy was investigated using the combinatorial material experimental apparatus explained above. The results are shown in FIG. 13.

At first, it seemed difficult to obtain amorphous phase in the Pt—Ir-alloy system because the alloy forms solid solution over all composition ratios. However, compositions showing amorphous phase were realized by including Zr as the third element.

Making full use of this finding as a base, each film having $Pt_{42}Ir_{17}Zr_{41}$ and $Pt_{38}Ir_{25}Zr_{41}$ composition was prepared using the multi-source simultaneous sputtering apparatus and evaluation of the crystallization temperature $T_x$ using the X-ray diffraction method and glass transition temperature $T_g$ using the indenting test method were conducted. Further, tensile strength measurement was performed. As the results, it was found that both $Pt_{42}Ir_{17}Zr_{41}$ and $Pt_{38}Ir_{25}Zr_{41}$ have $T_x$ of 700 degrees centigrade and tensile strength of 0.81 Gpa. These values are almost equal to the alloy explained above. Existence of super-cooled liquid state region could not be confirmed by the indenting test method.

Test of adhesion resistance to molten glass was conducted for the $Pt_{42}Ir_{17}Zr_{41}$ and $Pt_{38}Ir_{25}Zr_{41}$ using the dropping method explained above. As the results, the both films did not show adhesion to glass similar to the case for $cPt_{48}Hf_{22}Zr_{15}Ni_{15}$ film. As the result of X-ray diffraction measurement of the surface after the test, an occurrence of crystallization was not found.

EXAMPLE 4

Fabrication of Pt80Zr19Si1 Dies

Using HPM50 (pre-hardened steel) was used for mother material and roughly cutting to required shape and dimension, and amorphous Pt80Zr19Si1 alloy film was formed in 100 μm thick. Using Pt, Zr and Pt—Si targets with a Carousel type RF spattering apparatus and rotating the substrate such that the deposition thickness per rotation was controlled to equal or less than the diameter of atoms in the Pt, Zr or Pt—Si.

Output of each target was controlled adequately in order to obtain the required composition. Using EDX, the film was confirmed to have the required composition.

<Processing Dies>

As the shape of the die surface for forming optical surface (the surface to be processed), the shape of an optical surface having function of diffraction optics of DVD/CD dual-purpose plastic lens was chosen. Number of the rings is 28, the effective radius is 2.032 mm, the maximum normal line angle in the effective radius is 52.4 degrees, and the depth of the maximum step is 1.565 μm.

Raw material of the die was set to an ultra-precise working machine rotating at 1000 rpm and transitionally moving the front edge of the diamond tool from outer side to center at a feed rate of 0.1 mm per minute, and cutting work was conducted to obtain a shape of required diffraction optical surface.

Applying the machining method explained above, the required shape having a dimensional variation clearance within 200 nm could be attained without loosing blade edge of a diamond tool.

<Durability Evaluation of Die for Glass Molding>

A glass mold test using the die manufactured above was conducted. The molding temperature was set to 500 degrees centigrade. For the die step depth of 1.565 μm, the molded lens step depth of 1.491 μm was obtained. The transfer rate at the diffraction steps was percent or more as sufficiently usable level of a product. After molding work of 12,000 times, no change in the diffraction step was found.

EXAMPLES 5-25

Fabrication of Other Pt Amorphous Alloy Dies and their Evaluation

Dies of Examples 5-25 were fabricated applying the preparation process explained in example 4, except for replacing the sputtering alloy composition to each alloy composition shown in Tale 1. After cutting work, each die was used for glass molding and evaluated each transfer rate and durability. For Examples 10-14, the results of fracture elongation measurement using a thermal mechanical analysis (TMA) apparatus were shown.

Measured results of transfer rate for the depth of steps and available number of repetition of molding for each sample of Examples 5-25 are shown in Table 1. In Table 1, every die attained at 95 percent or more of the stepping depth transfer rate. It was very interesting to find out that the surface roughness Ra of the surface machined by diamond cutting is correlated with the transfer rate of the stepping depth, and larger transfer rate of stepping depth approaching to 100 percent was attained when surface roughness is small. For this reason, the arithmetic average roughness $R_a$, defined by Japanese Industrial Standards (JIS), of the surface after cutting by diamond tool is desirable to be 10 nm or less. A non-contact three-dimensional surface shape measuring apparatus (WYCO NT4800) manufactured by Veeco Co is used for the surface roughness measurements and from the measurement the surface roughness value defined by JIS was obtained. In Table 1, the results of surface roughness measurement for the sample surfaces processed using diamond cutting are also shown.

TABLE 1

| | Triangle Phase Figure | Alloy Composition (at %) | | | Glass Transition Temp $T_g$ (deg. c.) | Crystallizaton Temp $T_x$(deg. c.) | Surface Roughness (nm) | Step Transf. Rate (%) | Effective Molding Number | TMA fracture strength (Mpa) |
|---|---|---|---|---|---|---|---|---|---|---|
| Example 5 | FIG. 7 | Pt 80 | Zr 19 | Si 1 | | | 1.0 | >95 | >1000 | |
| Example 6 | FIG. 7 | Pt 40 | Zr 40 | Si 20 | | | 4.4 | >95 | >1000 | |
| Example 7 | FIG. 7 | Pt 40 | Zr 20 | Si 40 | | | 9.0 | >95 | >1000 | |
| Example 5 | | Pt 85 | Zr 14 | Cu 1 | | | 3.4 | >95 | >1000 | |
| Example 8 | | Pt 85 | Zr 14 | Fe 1 | | | 3.2 | >95 | >1000 | |
| Example 9 | | Pt 85 | Zr 14 | Co 1 | | | 4.0 | >95 | >1000 | |
| Example 10 | | Pt 85 | Zr 14 | Al 1 | | | 2.2 | >95 | >1000 | 1367 |
| Example 11 | FIG. 10 | Pt 52 | Hf 36 | Ni 12 | | <550 | 2.8 | >95 | >1000 | 372 |
| Example 12 | FIG. 10 | Pt 57 | Hf 39 | Ni 4 | 500-550 | <700 | 3.6 | >95 | >1000 | 300 |
| Example 13 | | Pt 64 Hf 23 Zr 8 | | Ni 5 | ~550 | ~750 | 0.6 | >95 | >1000 | 870 |
| Example 14 | | Pt 64 Hf 25 Zr 6 | | Ni 5 | ~550 | ~750 | 0.4 | >95 | >1000 | 705 |
| Example 15 | FIG. 11 | Pt 60 | Hf 35 | Ru 5 | | | 2.6 | >95 | >1000 | |
| Example 16 | | Pt 85 | Ir 14 | Ru 1 | | | 7.2 | >95 | >1000 | |
| Example 17 | | Pt 85 | Ir 14 | Si 1 | | | 8.8 | >95 | >1000 | |

TABLE 1-continued

|  | Triangle Phase Figure | Alloy Composition (at %) | | | Glass Transition Temp $T_g$ (deg. c.) | Crystallizaton Temp $T_x$ (deg. c.) | Surface Roughness (nm) | Step Transf. Rate (%) | Effective Molding Number | TMA fracture strength (Mpa) |
|---|---|---|---|---|---|---|---|---|---|---|
| Example 18 |  | Pt 85 | Ru 14 | Hf 1 |  |  | 8.4 | >95 | >1000 |  |
| Example 19 | FIG. 9 | Pt 65 | Ru 30 | Si 5 |  |  | 3.2 | >95 | >1000 |  |
| Example 20 |  | Pt 85 | Pd 14 | Si 1 |  |  | 2.4 | >95 | >1000 |  |
| Example 21 |  | Pt 85 | Pd 14 | Hf 1 |  |  | 1.8 | >95 | >1000 |  |
| Example 22 | FIG. 8 | Pt 60 | Ni 25 | Si 15 |  |  | 2.0 | >95 | >1000 |  |
| Example 23 | FIG. 10 | Pt 55 | Ni 25 | Hf 20 |  |  | 3.2 | >95 | >1000 |  |
| Example 24 |  | Pt 65 | | Zr 35 |  |  | 0.8 | >95 | >1000 |  |
| Example 25 |  | Pt 85 | | Hf 15 |  |  | 2.0 | >95 | >1000 |  |

As shown in Table 1, every die of Examples 5-25 using the Pt alloy film showed good molding characteristics with the step depth transfer rate of 95 percent or more. The available number of molding repetition is more than 10,000 showing excellent durability. As a result of fracture strength measurement using thermal mechanical analysis (TMA), the strength is 300 MPa or more for Pt—Hf—Ni alloys of Examples 9-10, 300 Mpa or more for Pt—Hf—Zr—Ni alloys of Examples 11-12, and 1,000 Mpa or more for Pt—Zr—Al alloys of Example 10. In Table 1, glass transition temperature and crystallization temperature of metallic glasses explained below are also shown.

COMPARATIVE EXAMPLE 1

Formation of diffraction grooves was tried on heat resistant hard metal alloy (WC/Co) by diamond cutting applying the procedure of the processing of Example 4. When the cutting was advanced to 1.2 μm out of the 1.565 μm step depth, the blade edge was lost. Then, the formation of diffraction grooves was not completed.

COMPARATIVE EXAMPLE 2

Applying the procedure of Example 4, except for using amorphous Ni—P (Tx of about 300 degrees centigrade) formed by electroless plating known as die material for molding plastic lens, a die was fabricated and diffraction grooves were formed on the amorphous alloy. Glass lens molding was tried using the obtained die applying the procedure of the die fabrication process of Example 4. At the first lens molding, a lens having the step depth of 1.487 μm corresponding to a transfer rate over 95 percent to the die step depth of 1.565 μm at a level available as a product was obtained. However, the die was damaged in the second course of molding, so the molding was stopped.

COMPARATIVE EXAMPLE 3

Formation of the sputtered film, cutting, glass molding and durability evaluation were performed applying the procedure of Example 4, except for using amorphous metal alloy Co: 72 atomic percent, B: 14 atomic percent, Si: 9.6 atomic percent and Nb: 4 atomic percent (($Co_{0.75}B_{0.15}Si_{0.10})_{96}Nb_4$).

COMPARATIVE EXAMPLES 4 AND 5

As Comparative Example 4, cutting, glass molding, durability evaluation of the die, and the surface roughness measurement after the diamond cutting were performed applying the procedure of Example 4, except for using amorphous metal alloy of Pt of 76 atomic percent, Cu of 6 atomic percent and Si of 18 atomic percent instead of the amorphous metal alloy formation of the sputtered film. As Comparative Example 5, cutting, glass molding, durability evaluation of the die, and the surface roughness measurement after the diamond cutting were performed applying the procedure of Example 4, except for using amorphous metal alloy of Pt of 60 atomic percent, Ni of 15 atomic percent and P of 25 atomic percent instead of the amorphous metal alloy formation of the sputtered film.

COMPARATIVE EXAMPLES 6-8

As Comparative Examples 6, 7 and 8, cutting, glass molding, durability evaluation of the die, and the surface roughness measurement after the diamond cutting were performed applying the procedure of Example 4 except for using amorphous metal alloy having Pt of 20 atomic percent and Zr of 80 atomic percent, amorphous metal alloy having Pt of 20 atomic percent, Zr of 70 atomic percent and Ni of 10 atomic percent, and amorphous metal alloy of Pt of 60 atomic percent, Cu of 20 atomic percent and P of 20 atomic percent, respectively, instead of the amorphous metal alloy formation by the sputtered film. Results of these Comparative Examples 1-8 were shown in Table 2.

TABLE 2

|  | Alloy Composition (at %) | | | Glass Transition Temp $T_g$ (deg. c.) | Glass Transition Temp $T_x$ (deg. c.) | Surface Roughness (nm) | Step Transfer. Rate (%) | Effective Molding Number | TMA fracture strength (Mpa) |
|---|---|---|---|---|---|---|---|---|---|
| Comparative Example. 1 | WC/Co | | | | | | | 0 | 0 |
| Comparative Example. 2 | Ni 93 | P 7 | | | | 1.0 | >95 | | 1 |
| Comparative Example. 3 | ($Co_{0.75}B_{0.15}Si_{0.10})_{0.96}Nb_4$ | | | 537 | 577 | 30.8 | | 81 | 90 |
| Comparative Example. 4 | Pd 76 | Cu 6 | Si 18 | 383 | 400 | 0.6 | >95 | | 13 |

TABLE 2-continued

|  | Alloy Composition (at %) | | | Glass Transition Temp $T_g$ (deg. c.) | Glass Transition Temp $T_x$ (deg. c.) | Surface Roughness (nm) | Step Transfer. Rate (%) | Effective Molding Number | TMA fracture strength (Mpa) |
|---|---|---|---|---|---|---|---|---|---|
| Comparative Example. 5 | Pt 60 | Ni 15 | P 25 | 212 |  | 1.6 | >95 |  | 1 |
| Comparative Example. 6 | Pt 20 | Zr 80 |  | ~474 | ~515 | 56.2 |  | 74 | 48 |
| Comparative Example. 7 | Pt 20 | Zr 70 | Ni 10 | 474 | 515 | 61.0 |  | 67 | 39 |
| Comparative Example. 8 | Pt 60 | Cu 20 | P 20 | 236 | 286 | 2.2 | >95 |  | 1 |

As seen from the table, die having molding capability and durability could not be obtained in the results of Comparative Examples 1-5.

EXAMPLE 26

Evaluation of High Temperature Glass Transition Temperature

Since the heat resistant alloys according to the present invention have very high crystallization temperature Tx, a conventional measuring method of Tg and Tx such as differential thermal analyzer (DTA) cannot be applied to these alloys. So, the Tg and Tx of the alloys were evaluated using the indenting test method introduced by the inventors.

Figure 14:
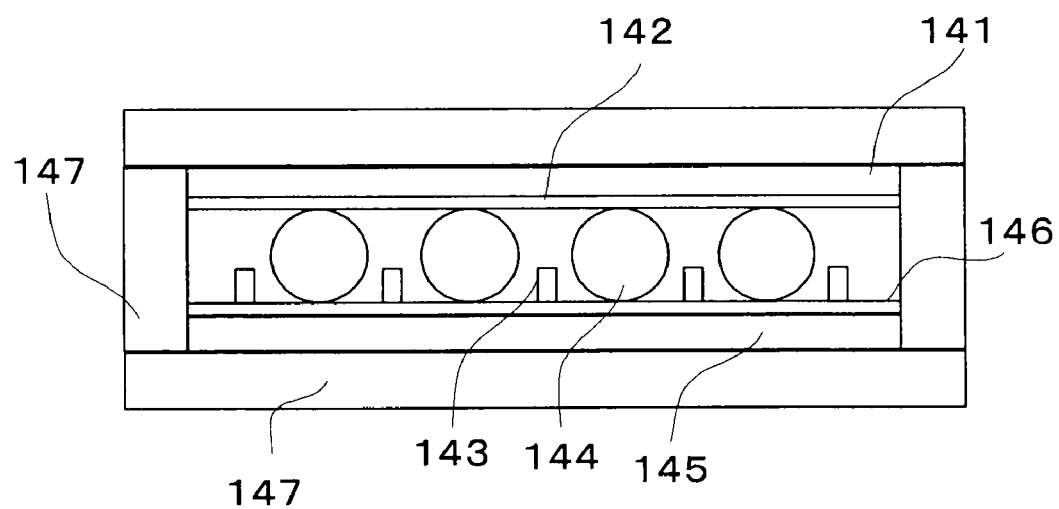
FIG. 14 is a schematic lateral view showing an appearance of indenting test at a high temperature.

FIG. 14 is an appearance of the high-temperature indenting test apparatus illustrated by a schematic side view. In FIG. 14, Cr spheres 144 positioned by guides 143 pushes a sample 146 (such as a sample in a library on alumna substrate 145 or a sputtered film sample) using a Mo foil 142 and Mo plate 141) as a weight. The pushed state was maintained using a jig 147, and the apparatus was heated in vacuum. Using the high-temperature indenting test, existence of a flow state due to glass transition is evaluated as a result of investigating the sample surface after indentation such as the existence of indented trace and the appearance the trace.

First of all, the high temperature indenting test was performed for known metallic glass $Pd_{77}Cu_6Si_{17}$ with heating condition of 400 degrees centigrade for 1 minute, and the indented trace was observed using confocal microscope. As the result, a ring shaped bulge showing glass flow was observed. The $T_g$ and Tx of this metallic glass can be measured by differential scanning calorimeter (DSC). The results of DSC measurement for this metallic glass are $T_x$ of 400 degrees centigrade, $T_g$ of 383 degrees centigrade and ΔT of 17 degrees centigrade, certifying the result obtained from the indenting test. Applying this indenting test method to library films of ternary amorphous alloys, a classification of metallic glasses that show flow of super-cooled liquid due to glass transition and amorphous alloys that does not show the liquid flow was obtained using a criterion of existence or nonexistence of ring shaped bulge.

Figure 15:
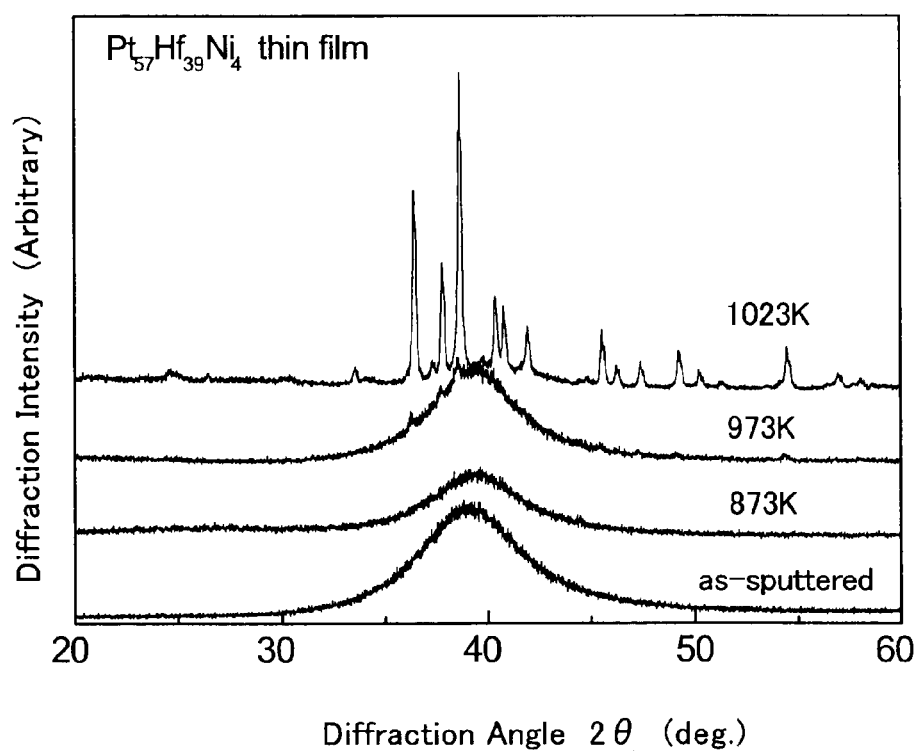
FIG. 15 shows the change of the X-ray diffraction result as a result of heat treatment in vacuum.

$Pt_{57}Hf_{39}Ni_4$ film was formed using the sputtering method. FIG. 15 shows a result of XRD measurement for $Pt_{57}Hf_{39}Ni_4$ films after heat-treated at each temperature in vacuum. As seen from the result shown in FIG. 15, crystallization did not occur up to 873 K.

Figure 16:
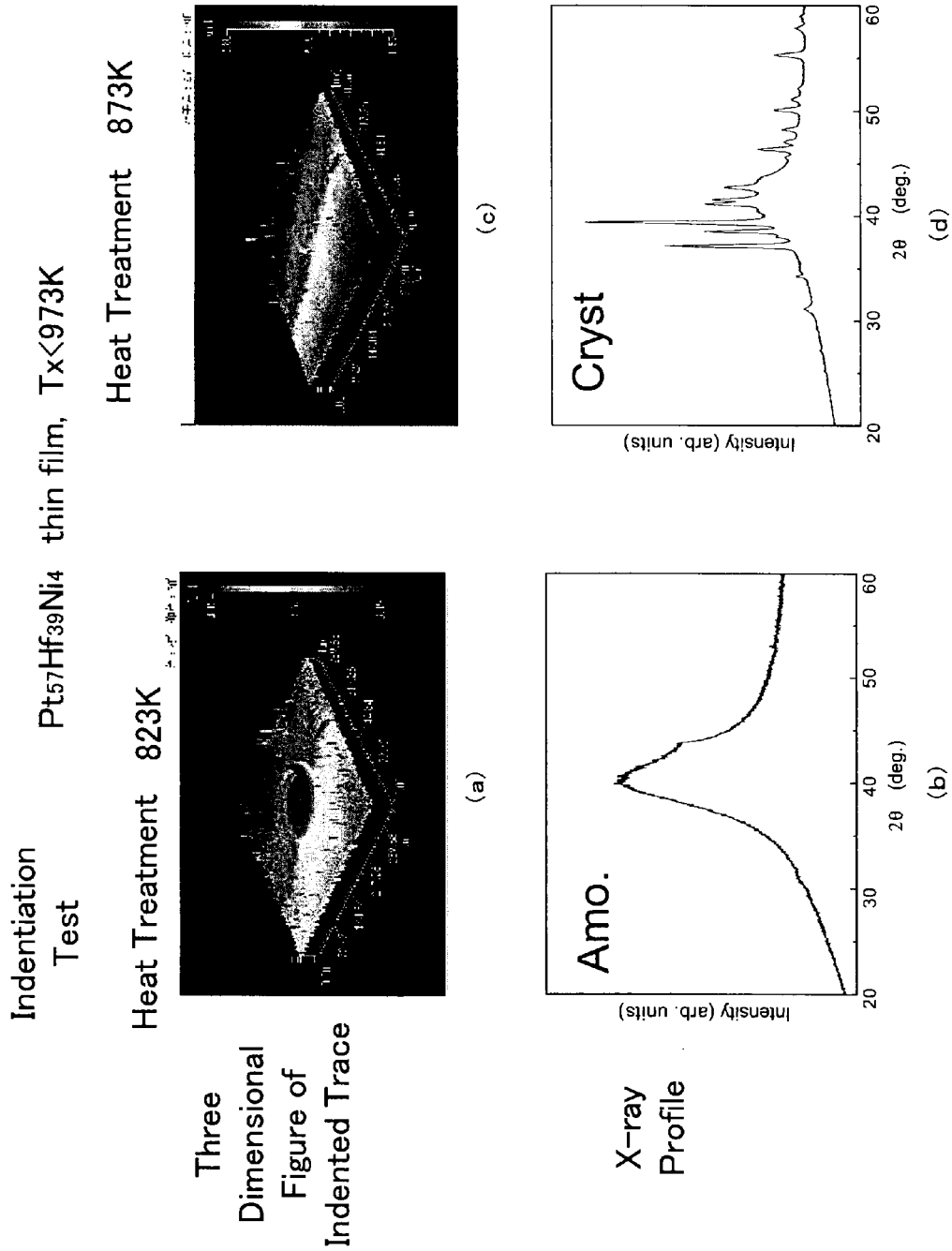
FIG. 16 shows the shape of an indented trace after an indenting test at 823 degrees centigrade (bumps with ring shape) (a), the result of X-ray diffraction measurement after an indenting test at 823 degrees centigrade (b), the shape of indentation after an indenting test at 873 degrees centigrade (c), and the result of X-ray diffraction measurement after an indenting test at 873 degrees centigrade (d) for $Pt_{57}Hf_{39}Ni_4$ film deposited on an $Al_2O_3$ substrate by the sputtering method.

The indenting test explained above was applied to $Pt_{57}Hf_{39}Ni_4$ film formed on $Al_2O_3$ substrate prepared by using the sputtering method. The heating condition was at 823 K for 1 minute. As shown in FIG. 16(a), a ring shaped bulge around the indented trace is found showing that the alloy is press-moldable around the temperature.

Result of XRD measurement for the sample after the indenting test is shown in FIG. 16(b). In FIG. 16(b), diffraction peak due to diffraction from crystal phase was not found showing that the crystallization does not occur even after indenting at 823 K.

The indenting test at heating temperature of 873 K for 1 minute was performed for sputtered $Pt_{57}Hf_{39}Ni_4$ film on $Al_2O_3$ substrate. As shown in FIG. 16(c), a ring shaped bulge around the indented trace is not found showing that the alloy is moldable by press around this temperature.

Result of XRD measurement for the sample after the test is shown in FIG. 16(d). In FIG. 16(d), diffraction peaks due to diffraction from crystal phase were found showing that the crystallization occurs.

From these results, it was found that this alloy has $T_x$ of around 870 K and shows press moldable characteristics at a lower temperature range around 823 K.

Figure 17:
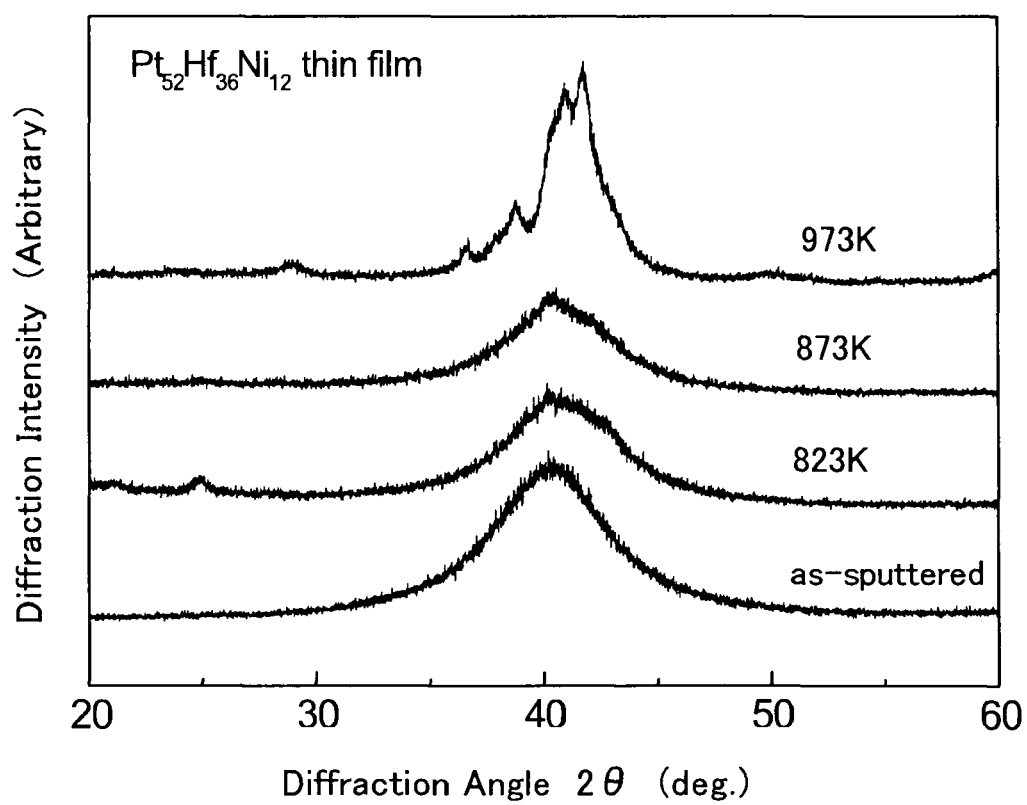
FIG. 17 shows a change of the X-ray diffraction measurement result of a $Pt_{62}Hf_{36}Ni_{12}$ film due to heat treatments in vacuum.

$Pt_{52}Hf_{36}Ni_{12}$ film was formed using the sputtering method. FIG. 17 shows XRD measurement results of the $Pt_{52}Hf_{36}Ni_{12}$ film after heat treating at each temperature. It is found from FIG. 17 that the crystallization does not occur up to 873 K. Peaks caused by crystallization begin to appear at the heat treating temperature of 973 K.

The indenting test explained above was applied to $Pt_{52}Hf_{36}Ni_{12}$ film formed on $Al_2O_3$ substrate using the sputtering method. The heating condition was for 1 minute at 773 K. As shown in FIG. 18(a), a ring shaped bulge around the indented trace is found showing that the alloy is press-moldable around the temperature.

Result of XRD measurement for the sample after the test is shown in FIG. 18(b). In FIG. 18(b), diffraction peak due to diffraction from crystal phase was not found showing that the crystallization does not occur.

The indenting test at heating temperature of 823 K for 1 minute was performed for sputtered $Pt_{52}Hf_{36}Ni_{12}$ film on $Al_2O_3$ substrate. As shown in FIG. 18(c), a ring shaped bulge around the indented trace is found showing that the alloy is press moldable around this temperature.

Result of XRD measurement for the sample after the test is shown in FIG. 18(d). In FIG. 18(d), diffraction peaks due to diffraction from crystal phase were found showing that a little crystallization occurs.

The indenting test at heating temperature of 873 K for 1 minute was performed for sputtered $Pt_{52}Hf_{36}Ni_{12}$ film on $Al_2O_3$ substrate. As shown in FIG. 18(e), a ring shaped bulge around the indented trace is found showing that the alloy is press moldable around this temperature.

Result of XRD measurement for the sample after the test is shown in FIG. 18(f). In FIG. 18(f), diffraction peaks due to diffraction from crystal phase were found showing that a little crystallization occurs.

These evaluation results of the glass transition temperature and crystallization temperature at high temperature are described in column of Examples 11-10 of Table 1 describing results of Examples 5-25. In Table 1, results of glass transition temperature evaluation and crystallization temperature evaluation of Pt alloy shown as Examples 15-16 are also described.

From these results, it was found that these alloys have $T_x$ of higher than 870 K and show press moldable characteristics above this temperature. Pt alloys according to the present invention show press moldable characteristics due to the existence of metallic glass phase even if the alloys are partially crystallized. Therefor, the alloys according to the present invention can be alloys having co-existence phase of amorphous phase and crystal phase.

EXAMPLE 27

Search of Ru Alloys Using the Combinatorial Method

In order to specify Ru alloy composition showing amorphous phase, samples of many composition ratios were prepared at once using the combinatorial material experiment apparatus explained above with combinatorial material substrates.

<Preparation of Combinatorial Material Substrate>

About 100 nm $Si_3N_4$ film was formed on a substrate ($SiO_2$, 3 inch size, 500 mm length) using the sputtering method. Photo-resist (PMGI, supplied by KAYAKU MICROCHEM Co. Ltd.) was coated on the film for about 2 μm by a spin coating method and pre-baked.

About 5 μm Cu film was formed on the PMGI using a sputtering method.

(a) Patterning

Photo-resist (OFPR-800, produced by Tokyo Ooka, Co. Ltd) was coated on the film and pre-baked.

Whole shape and size of the grid pattern is a square with side length of 39.6 mm×39.6 mm, and 1,089 samples in total having a size of placing 33 in row and column 33 there. The grid line-width is 200 μm. The grid pattern was formed after exposure using the photo-resist (OFPR-800) as the photomask and development using NMD-3. Further, etching of Cu by 38 percent nitric acid solution was conducted.

(b) Photo-Resist Development

The photo-resist (PMGI) under the Cu-etching surface was developed using NMD-3 adjusting the time of development such that T-top (umbrella like) type shape patterns were formed. Then, the substrate was rinse its surface by pure water and dried.

<Preparation of Samples>

Ru—Zr—Fe alloy film was formed on the combinatorial material substrate setting Ru, Zr and Fe as the three CAPG electrodes of the experimental apparatus.

The forming condition was as follows:

Base pressure: $3.0 \times 10^{-5}$ Pa.

Condenser capacity: 8,800 μF for Ru only, 6,600 μF for Zr and Fe.

Number of discharges: 36,400 times in total (26,000 for Ru, 7,800 for Zr, and 2,600 for Fe).

The combinatorial substrate after forming the alloy film was dipped into remover liquid (produce by KAYAKU MICROCHEM Co. Ltd.), and then a lift-off of the resist and Cu was conducted.

<Evaluation of Samples>

Composition ratios of the samples were determined by X-ray fluorescence measurement using energy dispersive X-ray spectrometer (EDS) (produced by EDX-1200, Shimazu Co Ltd.) and the spectrum analysis by the fundamental parameter method using a imaging plate (IP) X-ray diffraction apparatus (Rint Rapid, produced by Rigaku Co.). Both the EDX and the IP X-ray diffraction apparatus have functions of multi point automatic measurement by X-Y stage and high-speed measurement.

Classification into amorphous phase, crystal phase and transitional phase between amorphous phase and crystal phase (mixed portion) was made using results of X-ray diffraction intensity distribution measurements. Criterion of the classification is as follows:

Amorphous phase portion: Ru peak line-width around 40 degrees is 5 degrees or more, and no other peak due to crystallization is found.

Transition portion: Ru peak line-width around 40 degrees is 5 degrees or more, and other peak due to crystallization is found.

Crystal phase portion: Ru peak line-width around 40 degrees is less than 5 degrees.

Figure 19:
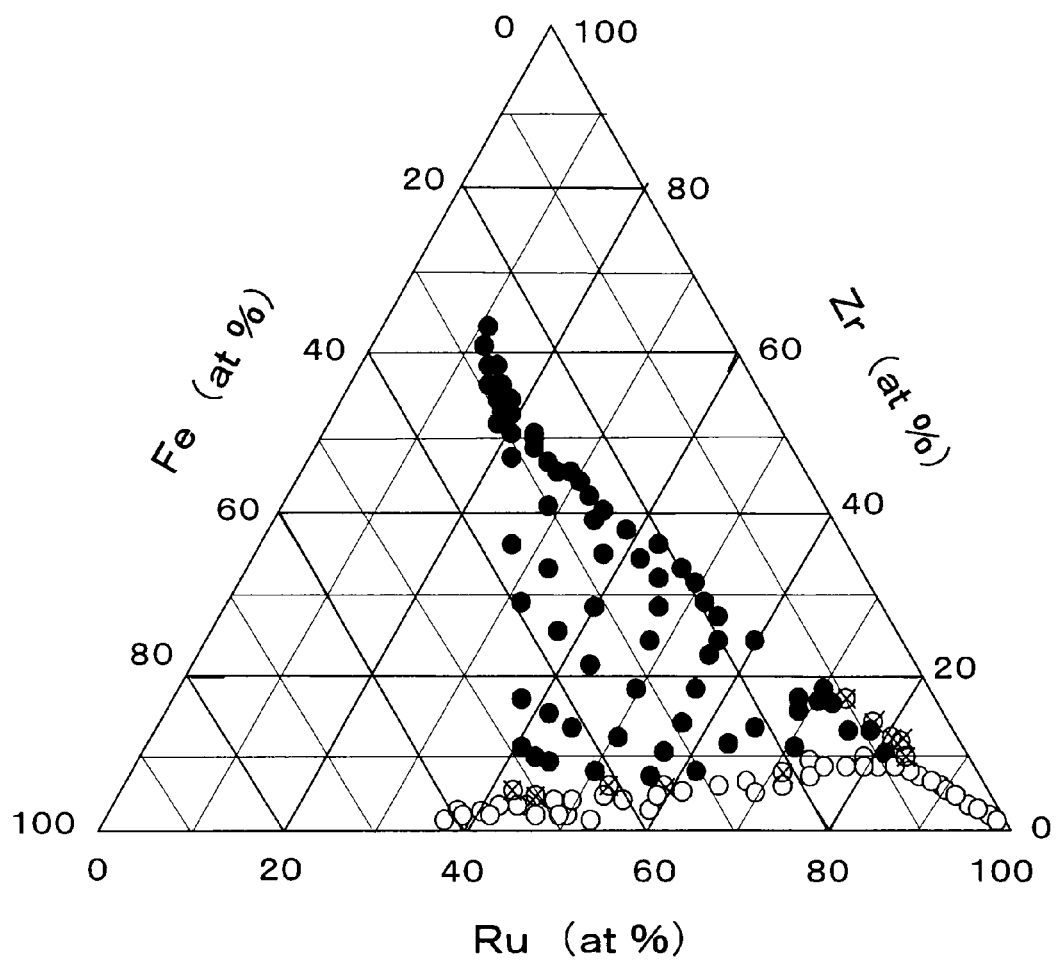
FIG. 19 shows the evaluation result of Ru—Zr—Fe ternary alloy samples prepared using the combinatorial material experimental apparatus.

The evaluated results of samples are shown in FIG. 19. In this figure, results of the classification into amorphous phase, transition phase (amorphous phase and crystal phase) and crystal phase was illustrated.

Figure 20:
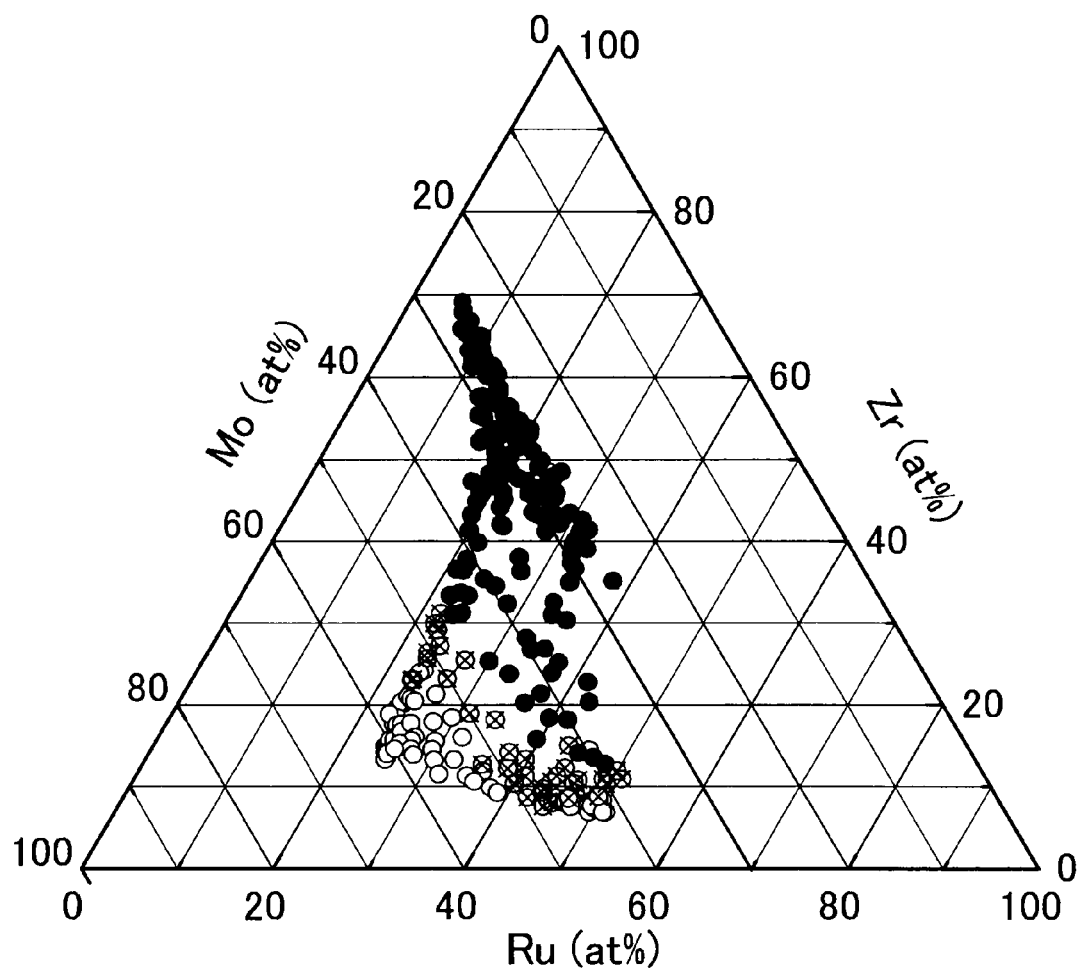
FIG. 20 shows the evaluation result of Ru—Zr—Mo ternary alloy samples prepared using the combinatorial material experimental apparatus.
Figure 21:
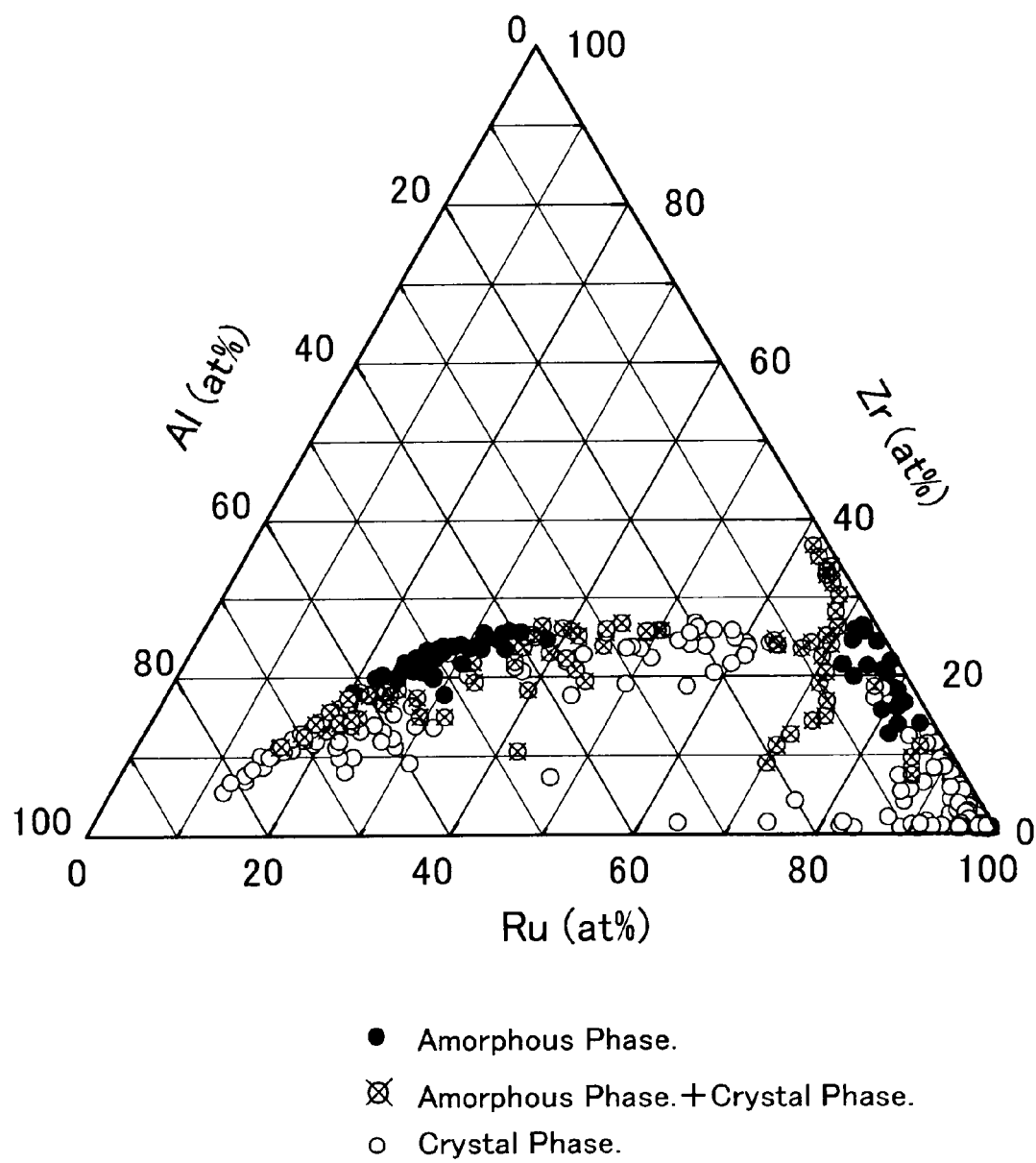
FIG. 21 shows the evaluation result of Ru—Zr—Al ternary alloy samples prepared using the combinatorial material experimental apparatus.
Figure 22:
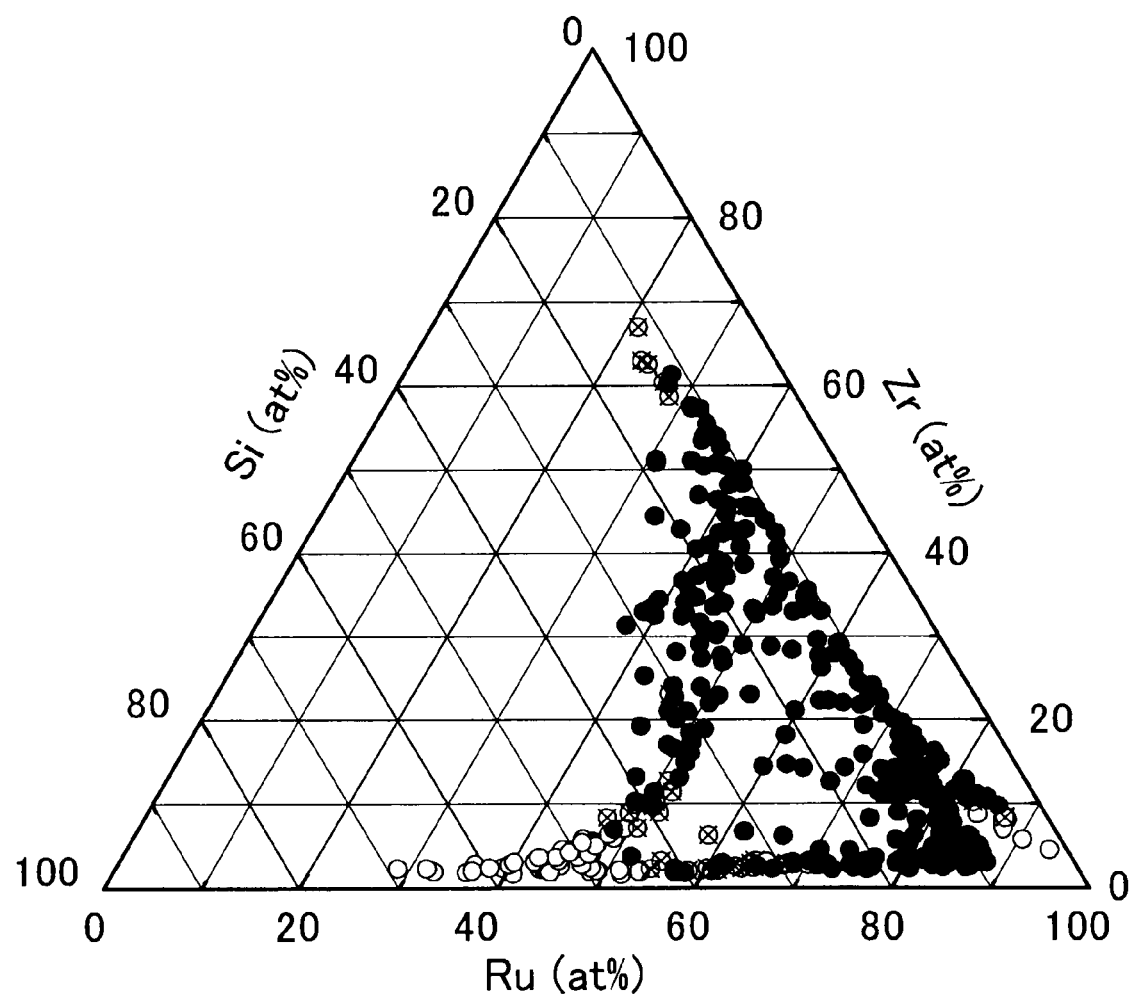
FIG. 22 shows the evaluation result of Ru—Zr—Si ternary alloy samples prepared using the combinatorial material experimental apparatus.

Similar to the Ru—Zr—Fe ternary system, sample preparations of Ru—Zr—Co, Ru—Zr—Mo, Ru—Zr—Si, and Ru—Zr—Al ternary systems were conducted using the combinatorial material experimental apparatus applied above, and the classification of phases into amorphous phases and crystal phases was performed. As the results, it was confirmed that amorphous alloy phase can be obtained for each of these ternary alloy systems. FIG. 20 shows the classification result for Ru—Zr—Mo ternary alloy system. FIG. 21 shows the classification result for Ru—Zr—Al ternary alloy system. Further, FIG. 22 shows the classification result for Ru—Zr—Si ternary alloy system.

EXAMPLE 28

Formation of Sputtered Films and their Evaluation

The films having the following compositions were formed using the multi-source simultaneous sputtering apparatus and the films were applied for each evaluation items.

Ru—Zr—Mo system: $Ru_{54}Zr_{24}Mo_{22}$

Ru—Zr—Si system: $Ru_{76}Zr_{15}Si_9$, $Ru_{86}Zr_5Si_9$,

Ru—Zr—Si system: $Ru_{75}Zr_{24}Al_1$, $Ru_{81}Zr_{18}Al_1$, $Ru_{84}Zr_5Si_9$, $Ru_{75}Zr_{17}Al_8$ Toughness was evaluated by conducting 180 degrees bending test using test samples having 3 μm film thickness. As the results of the test, the 180 degrees bending was obtained for both Ru—Zr—Si and Ru—Zr—Al alloy systems, showing their excellent stiffness characteristics. However, for Ru—Zr—Mo ternary alloys, 180 degrees bending was not obtained.

Figure 23:
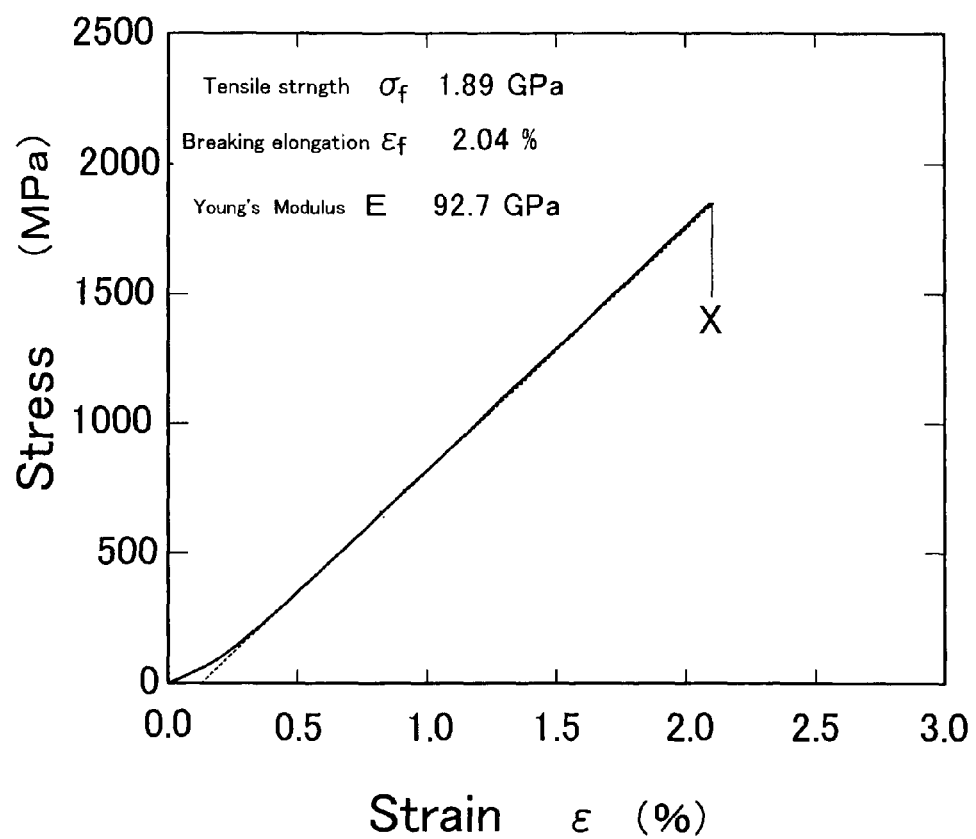
FIG. 23 shows a result of tensile strength test for Ru75Zr24Al1 alloy.

Tensile strength measurement was conducted by TMA. As the result, it was found that the tensile strength of $Ru_{86}Zr_5Si_9$ was 1.25 Gpa, and the tensile strength of $Ru_{75}Zr_{24}Al_1$ was 1.89 Gpa, and that both of these alloys show excellent mechanical strength. FIG. 23 shows the result of the tensile strength measurement for the $Ru_{75}Zr_{24}Al_1$.

Appearance of crystallization as a result of heating to 700 degrees centigrade was examined using the X-ray diffraction method. As the result, crystallization was not observed. A measurement to find super-cooled liquid zone was tried using the high temperature DSC. A clear glass transition at 629 degrees centigrade exhibiting an existence of metallic glass state was observed for the $Ru_{86}Zr_5Si_9$ film, so the film was confirmed to be a thin film metallic glass. This is the first finding of Ru alloy metallic glass thin film in the world.

EXAMPLE 29

Fabrication of RuZrFe Die

Mother die material HPM50 (pre-hardened steel) was machined roughly cutting the surface to the required shape, and Ru70Zr15Fe15 amorphous alloy film of 100 μm thickness was formed on the surface by a sputtering method.

The film deposition was conducted using Ru, Zr and Fe as target of a Carousel type RF sputtering apparatus (L-350S-C, product of ANELVA Co.) and rotating a substrate such that each deposition of one turn is adjusted to equal or less than atomic diameter of Ru, Zr, or Fe.

Output of each target was adequately adjusted in order to obtain the required composition ratio. The film composition was evaluated using EDX, and it was confirmed that the required composition was obtained.

<Die Processing>

As the shape of the die surface (surface to be machined) of forming optical surface. A diffraction optical surface of a DVD/CD dual-purpose plastic objective lens was chosen. In this Example, the number of rings was 28 and the effective radius was 2.032 mm. The maximum normal line angle was 52.4 degrees and the maximum stepping depth was 1.565 μm.

Raw material of the die was set to a dual axes control ultra-precise working machine and rotated at 1000 rpm. Transitionally moving the front edge of the diamond tool from outer side to center at a feed rate of 0.1 mm per minute and controlling X-axis table and Y-axis table by a program control method, the cutting work was conducted to obtain a shape having required diffraction optical surface.

Applying the machining method explained above, the required shape having a clearance of dimensional variation within 200 nm could be obtained without loosing blade edge of a diamond tool.

<Glass Molding and Die Durability>

A test for molding glass using the above manufactured die was performed using optical glass with $T_g$ of 400 degrees centigrade. The molding temperature was set to 500 degrees centigrade. For the die step depth of 1.565 μm, the step depth for the molded lens of 1.491 μm was obtained. The transfer rate at the diffraction steps was 95 percent or more. The result was at a level of sufficiently usable as a product. After molding 12,000 times, no change was found at the diffraction step portion.

EXAMPLE 30

Fabrication of RuZrAl Die

Using the same material HPM50 as the one used at Example 29, the material was machined to a required shape roughly cutting the surface and then, $Ru_{80}Zr_{17}Al_3$ amorphous alloy film having thickness of 100 μm was formed on the surface.

The film deposition was conducted using Ru, Zr and Al as a target of a Carousel type RF sputtering apparatus (L-350S-C, product of ANELVA Co.) and rotating a substrate such that each deposition rate per rotation is adjusted to a rate of equal or less than atomic diameter of Ru, Zr or Al.

Output of each target was adequately adjusted in order to obtain the required composition ratio. The film composition was evaluated using EDX, and it was confirmed that the composition was obtained.

EXAMPLE 31

Fabrication of RuZrCo Die

Following the process of Example 29, other than replacing the amorphous alloy composition by $Ru_{80}Zr_{15}CO_5$, sputtering film formation and cutting, glass molding, and durability evaluation of the die were performed.

EXAMPLE 32

Fabrication of RuZrMo Die

Following the process of Example 29, other than replacing the amorphous alloy composition $Ru_{54}Zr_{24}MO_{22}$, sputtering film formation and cutting, glass molding, and durability evaluation of the die were performed.

EXAMPLE 33

Manufacturing of RuZrSi Die

Following the process of Example 29, other than replacing the amorphous alloy composition $Ru_{86}Zr_5Si_9$, sputtering film formation and cutting, glass molding, and durability evaluation of the die were performed.

EXAMPLE 34

Manufacturing of RuSiFe Die

Following the process of Example 29, other than replacing the amorphous alloy composition $Ru_{86}Si_{15}Fe_5$, sputtering film formation and cutting, glass molding, and durability evaluation of the die were performed.

COMPARATIVE EXAMPLE 9

Mother die material HPM50 (pre-hardened steel) was shaped roughly cutting a surface to required shape, and NiP amorphous alloy (Tx of about 300 degrees centigrade) film was formed on the surface by an electroless plating method and formation of diffraction groove was conducted following the cutting process of Example 29.

Glass lens molding was tried using the manufactured die applying the procedure of the die processing of Example 29. A lens having the step depth of 1.487 μm corresponding to a transfer rate over 95 percent to the die step depth of 1.565 μm and available as a product, was obtained. However, the die was degraded in the second course of molding, so the molding could not conduct any more.

COMPARATIVE EXAMPLE 10

Following the die machining of Example 29, diffraction groove formation by cutting to heat resistant hard metal alloy (WC/Co) surface was tried. When the cutting was proceeded to the step depth of 1.2 μm in the course of forming 1.565 μm step depth, the front edge of the diamond tool was lost, and the diffraction groove cutting was not formed any more.

COMPARATIVE EXAMPLE 11

Molding die-having $Pd_{76}Cu_6Si_{18}$ film formed by the sputtering method using Pt, Cu and Si target was fabricated following the process of Example 29. Here, the sputtering condition is as follows. Base pressure: $3.0 \times 10^{-4}$ Pa, Target: Pd, Cu and Si, Substrate rotation: 50 rpm, Pd—Cu—Si pre-sputtering: output 50 W, Ar pressure 0.5 Pa, time 5 minutes, Pd—Cu—Si sputtering: output 102 W for Pd, 15 W for Cu, 132 W for Si, Ar pressure 0.5 Pa, time 480 minutes. This deposit rate of each element at the outputs shown above is 0.012 nm/rev for Cu, 0.177 nm/rev for Pd and 0.033 nm/rev Si. Using the manufactured die, glass lens molding was conducted following the procedure applied at Example 29. As the result, glass molding was possible up to 13th molding with step transfer rate of 95 percent or more, but the die was degraded in the course of the 14th molding and the molding became impossible any more.

COMPARATIVE EXAMPLE 12

Alloy target for forming $(Cu_{0.75}B_{0.15}Si_{0.10})_{96}Nb_4$ film was prepared by a copper casting type casting method. Using this target, the alloy film was formed on the surface of the mother material by a sputtering method following the procedure of Example 29, and sputtering film formation and cutting process were conducted. Then, evaluation of glass molding and durability of the manufactured die were performed.

Results of Examples 29-34 and Comparative Examples 9-12 were shown in Table 3 together with evaluated results of $T_x$ and $T_g$ obtained using a method explained at Example 35 explained below. Dies having both good molding characteristics and good durability could not obtained in these Comparative Examples 9-12.

As already shown in FIG. 14, Cr sphere 144 positioned by guide 143 having a weight of Mo plate 141 through Mo foil 142 pushes a sample (such as a sample in a library on alumna substrate 145 or a sputtered film sample) 146. The sample pushed by the Cr spheres was held by holding jig 147 keeping the pushed state and heated in vacuum. Investigating the traces by Cr spheres or the shape of the trace, evaluation work was performed to detect flows caused by glass transition as the high temperature test.

First, the high temperature indenting test was performed for known metallic glass $Pd_{77}Cu_6Si_{17}$ with heating condition of 400 degrees centigrade for 1 minute, and the indented trace observation was conducted using con-focal microscope. As the result, a ring shaped bulge showing glass flow was observed. The $T_g$ and $T_x$ of this metallic glass can be measured using differential scanning calorimeter (DSC). The results of DSC measurement for this metallic glass were $T_x$ of 400 degrees centigrade; $T_g$ of 383 degrees centigrade and $\delta T$ of 17 degrees centigrade, confirming the result obtained by the indenting test. Applying this indenting test method to library films of ternary amorphous alloys, a classification of metallic glasses that show flow of super-cooled liquid due to glass transition and amorphous alloys that does not show the liquid flow could be obtained using the criterion of existence or nonexistence of ring shaped bulge showing an availability of the test method.

Ru alloy films having a composition of $Ru_{86}Zr_5Si_9$ was formed on HPM50 mother material applying the sputtering

TABLE 3

| | Alloy Composition (at %) | | | Glass Transition Temperature $T_g$ (deg. c.) | Glass Transition Temperature $T_x$ (deg. c.) | Step Transfer. Rate (%) | Effective Number of molding |
|---|---|---|---|---|---|---|---|
| Example. 29 | Ru 70 | Zr 15 | Fe 15 | | | >95 | >10000 |
| Example. 31 | Ru 80 | Zr 17 | Al 3 | | 600-700 | >95 | >10000 |
| Example. 32 | Ru 80 | Zr 15 | Co 5 | | | >95 | >10000 |
| Example. 33 | Ru 54 | Zr 24 | Mo 22 | | about 700 | >95 | >10000 |
| Example. 34 | Ru 86 | Zr 5 | Si 9 | about 650 | about 700 | >95 | >10000 |
| Example. 35 | Ru 80 | Si 15 | Fe 5 | | | >95 | >10000 |
| Comparative Example 9 | Ni 93 | P 7 | | | | >95 | 1 |
| Comparative Example 10 | WC/Co | | | | | 0 | 0 |
| Comparative Example 11 | Pd 76 | Cu 6 | Si 18 | 383 | 400 | >95 | 13 |
| Comparative Example 12 | $(Co_{0.75}B_{0.15}Si_{0.10})$ 96 Nb 4 | | | 537 | 577 | 81 | 90 |

As shown in Table 3, excellent molding characteristics of more than 95 percent step depth transfer rate was obtained applying dies having Ru alloys explained at Examples 29-34. In addition, excellent durability of the available repetition of molding number of more than 10,000 was confirmed. On other hand, dies having both excellent molding characteristics and durability were not obtained from Comparative Examples 9-12.

EXAMPLE 35

Evaluation of Grass Transition at High Temperature

Figure 24:
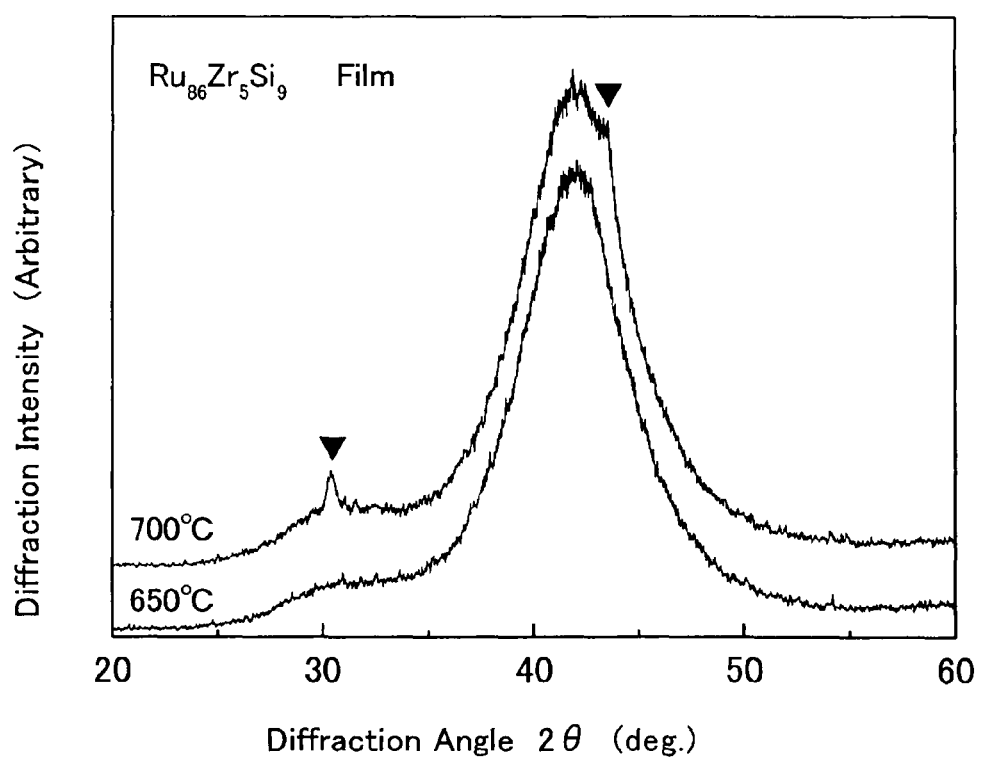
FIG. 24 shows an X-ray diffraction pattern of a Ru86Zr5Si9 film after heating in vacuum.

Since the heat resistant alloys according to the present invention have very high crystallization temperature, conventional evaluation methods such as differential scanning calorimeter are unsuitable for evaluating $T_g$ and $T_x$ of the alloys. Therefore, the indentation test method shown already by FIG. 14 was applied for evaluating $T_g$ and $T_x$ of these alloys according to the present invention.

method used at Examples 29-34. FIG. 24 shows X-ray diffraction measurement results for the films after heat-treating in vacuum. In FIG. 24, crystallization does not occur when the heating temperature was 650 degrees centigrade. When the heating temperature was 700 degrees centigrade, diffraction peaks due to crystallization appeared shown by revered delta marks. Therefore, the $T_x$ of the alloy was found to be about 700 degrees centigrade.

The indenting test explained above was applied to $Ru_{86}Zr_5Si_9$ film formed on $Al_2O_3$ substrate using the sputtering method. The heating condition was for 1 minute at 650 degrees centigrade. As shown in FIG. 25(a), a ring shaped bulge around the indented trace is found showing that the alloy is press-moldable around the temperature.

Result of XRD measurement for the sample after the test is shown in FIG. 25(b). In FIG. 25(b), diffraction peak due to diffraction from crystal phase was not found after hating up to 650 degrees centigrade showing that the crystallization did not occur.

Figure 26:
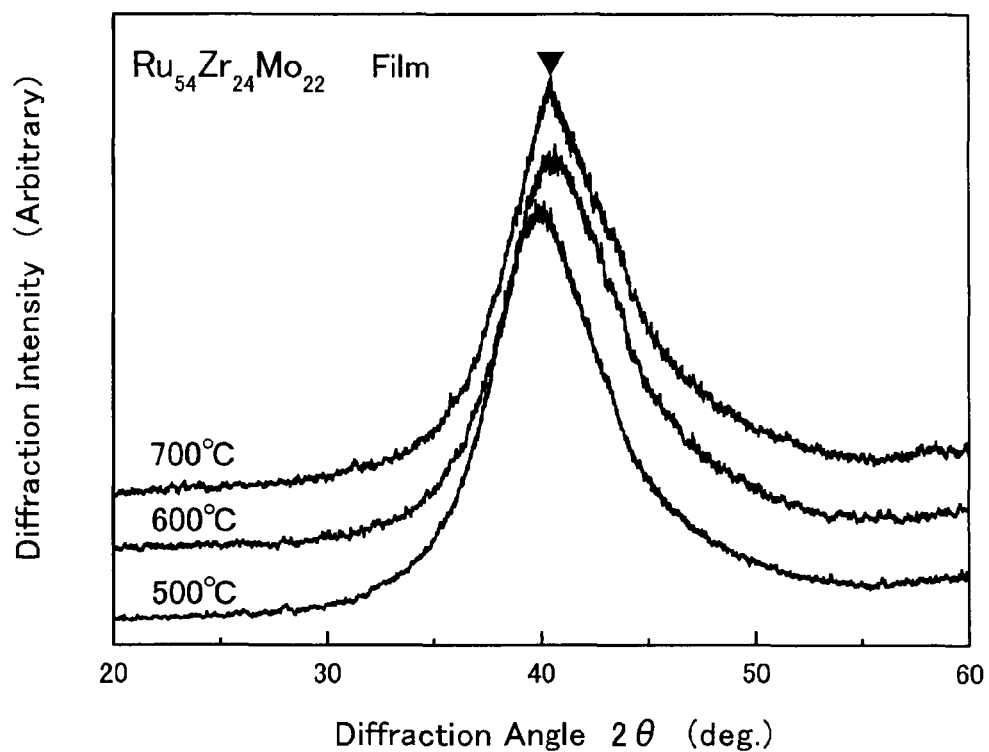
FIG. 26 shows a result of the X-ray diffraction measurement for a $Ru_{54}Zr_{24}Mo_{22}$ film after heat treatment in vacuum.

$Ru_{54}Zr_{24}MO_{22}$ films were formed using the sputtering method. FIG. 26 shows results of XRD measurement after heating the $Ru_{54}Zr_{24}MO_{22}$ films in vacuum. As seen from FIG. 26, the crystallization does not occur when the heating temperature is 600 degrees centigrade. When the heating temperature is 700 degrees centigrade, peaks due to crystallization were found at positions marked by inverted triangles. Therefore, it is found that the Tx of the alloy is around 700 degrees centigrade.

Figure 27:
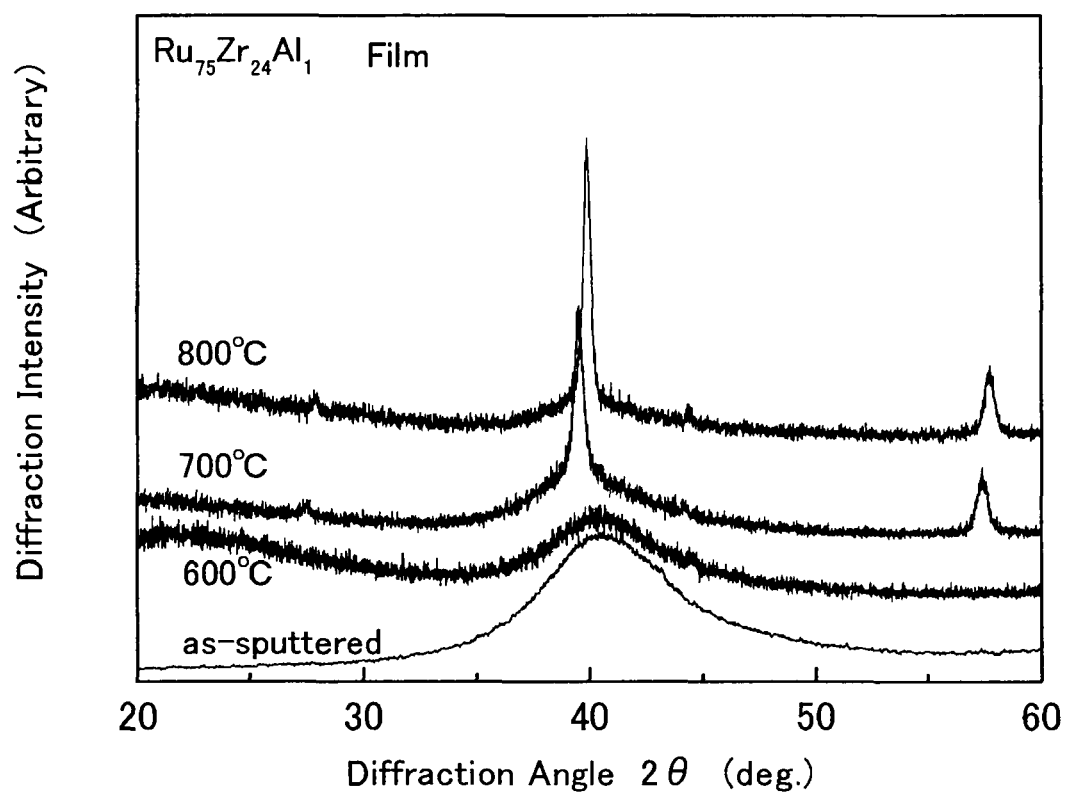
FIG. 27 shows a result of the X-ray diffraction measurement for a $Ru_{75}Zr_{24}Al_1$ film after heat treatment in vacuum.

$Ru_{75}Zr_{24}Al_1$ films were formed using the sputtering method. FIG. 27 shows results of XRD measurement after heating the $Ru_{75}Zr_{24}Al_1$ films in vacuum. As seen from FIG. 27, the crystallization does not occur when the heating temperature is up to 600 degrees centigrade. When the heating temperature is 700 degrees centigrade, peaks due to crystallization were found at positions marked by inverted triangles. Therefore, it was found that the $T_x$ of the alloy is in a range of 600-700 degrees centigrade. From the result for $Ru_{80}Zr_{17}Al_3$ film Of Example 29 by the same test, it was found that the $T_x$ of the alloy is in a range of 600-700 degrees centigrade.

EXAMPLE 36

Die Manufacturing Using Pt—(Hf, Zr)—Ni Alloy

Manufacturing of a die using amorphous alloy film having composition of $Pt_{48}Hf_{22}Zr_{15}Ni_{15}$ as a die for molding glass optical devices will be explained.

Figure 28:
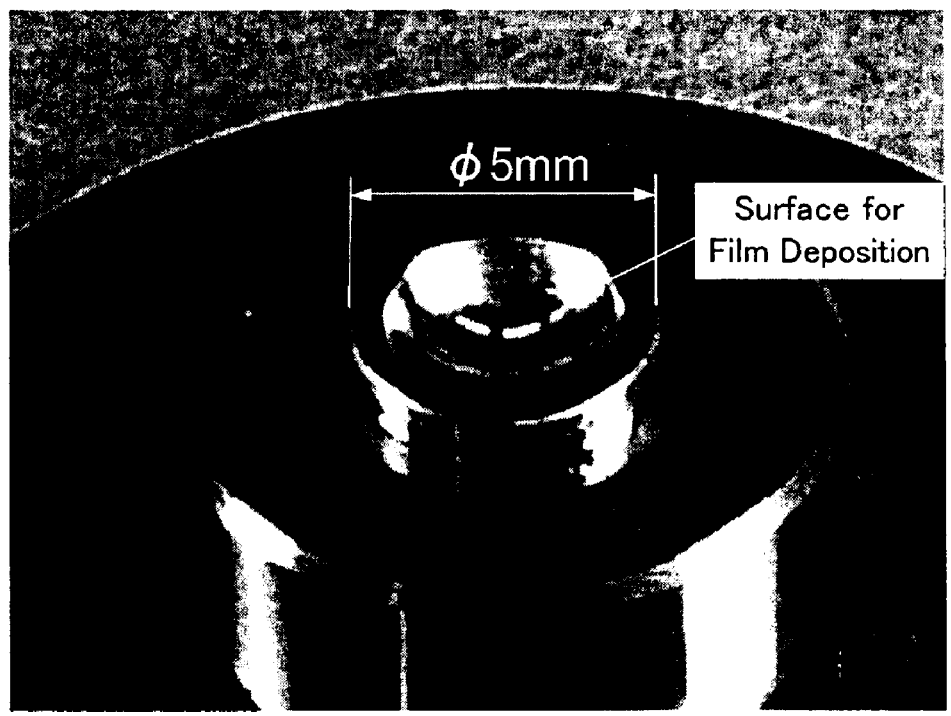
FIG. 28 shows a profile of the manufactured die for molding glass optical device.

To a hard metal blank die of 5 mm in diameter having an aspheric optical surface, film formation by RF magnetron sputtering was conducted using the alloy target and Ar with gas pressure of 0.5 Pa as the sputtering gas. The photograph in FIG. 28 shows the appearance of the die having diffraction grooves transferring surface formed by depositing $Pt_{48}Hf_{22}Zr_{15}Ni_{15}$ film in this way and cutting by a diamond tool. Very smooth surface after cutting with surface roughness ($R_{max}$) of 5 nm was obtained by cutting under the cutting conditions with tool feed speed of 0.2 mm/min and cutting quantity of 1 μm/min. After cutting, the scanning electron microscope observation of the blade edge of the diamond tool was performed. Then it was found that the wear of the blade was very small and that the film has excellent cutting machining characteristics.

FIG. 29 shows optical microscope photographs (magnifications of about 500) of diffraction grooves transferring surface. FIG. 29(a) is an optical microscope photograph of its center portion, and FIG. 29(b) is an optical microscope photograph of its peripheral portion. From the photographs it was found that the diffraction grooves were formed regularly and the die for molding glass optical devices was successfully manufactured.

[Industrial Availability]

The present invention provides alloys excellent at all of cutting characteristics, heat-resistant characteristics, and corrosion resistance characteristics and adhesion resistance. Dies that can mold glass optical devices such as glass optical devices having grooves became possible using the alloy. As the results, a volume production procedure of grooved glass optical devices applied to a high-density blue ray optical disk drive.

What is claimed is:

1. A corrosion resistant and heat resistant molding die alloy comprising an amorphous phase, comprising:
   more than 34 atomic percent and less than 93 atomic percent of Pt,
   more than 5 atomic percent and less than 60 atomic percent of Si, and
   more than 0 atomic percent and less than 60 atomic percent of Al, and comprising Pt the most and Al the least of Pt, Si and Al.

2. A corrosion resistant and heat resistant molding die alloy comprising an amorphous phase, comprising:
   more than 34 atomic percent and less than 93 atomic percent of Pt,
   more than 5 atomic percent and less than 60 atomic percent of Si, and
   more than 0 atomic percent and less than 60 atomic percent of Ni, and comprising Pt the most and Ni the least of Pt, Si and Ni.

3. A corrosion resistant and heat resistant molding die alloy comprising an amorphous phase, comprising:
   more than 34 atomic percent and less than 93 atomic percent of Pt,
   more than 5 atomic percent and less than 60 atomic percent of Si, and
   more than 0 atomic percent and less than 60 atomic percent of Ru, and comprising Pt the most and Ru the least of Pt, Si and Ru.

4. A die for molding optical devices comprising corrosion resistant and heat resistant alloy comprising an amorphous phase at least at a surface portion of the die, the alloy comprising:
   more than 34 atomic percent and less than 93 atomic percent of Pt,
   more than 5 atomic percent and less than 60 atomic percent of Si, and
   more than 0 atomic percent and less than 60 atomic percent of Al, and comprising Pt the most and Al the least of Pt, Si and Al.

5. The die for molding optical devices according to claim 4, wherein the corrosion resistant and heat resistant alloy is attached to a base.

6. The die for molding optical devices according to claim 4, wherein a surface for replicating optical surface for molding an optical surface of a optical device is formed on the corrosion resistant and heat resistant alloy.

7. The die for molding optical devices according to claim 6, wherein plural hollows or plural projections corresponding to plural projections or plural hollows are formed on the surface for replicating optical surface such that the plural hollows or plural projections are formed on the optical surface of the molded optical device.

8. The die for molding optical devices according to claim 4, wherein a surface for replicating geometrical size base level for molding a surface of geometrical size base level of the optical device is formed on the corrosion resistant and heat resistant alloy.

9. A die for molding optical devices comprising corrosion resistant and heat resistant alloy comprising an amorphous phase at least at a surface portion of the die, the alloy comprising:
   more than 34 atomic percent and less than 93 atomic percent of Pt,
   more than 5 atomic percent and less than 60 atomic percent of Si, and
   more than 0 atomic percent and less than 60 atomic percent of Ni, and comprising Pt the most and Ni the least of Pt, Si and Ni.

10. The die for molding optical devices according to claim 9, wherein the corrosion resistant and heat resistant alloy is attached to a base.

11. The die for molding optical devices according to claim 9, wherein a surface for replicating optical surface for molding an optical surface of a optical device is formed on the corrosion resistant and heat resistant alloy.

12. The die for molding optical devices according to claim 11, wherein plural hollows or plural projections corresponding to plural projections or plural hollows are formed on the surface for replicating optical surface such that the plural hollows or plural projections are formed on the optical surface of the molded optical device.

13. The die for molding optical devices according to claim 9, wherein a surface for replicating geometrical size base level for molding a surface of geometrical size base level of the optical device is formed on the corrosion resistant and heat resistant alloy.

14. A die for molding optical devices comprising corrosion resistant and heat resistant alloy comprising an amorphous phase at least at a surface portion of the die, the alloy comprising:
more than 34 atomic percent and less than 93 atomic percent of Pt,
more than 5 atomic percent and less than 60 atomic percent of Si, and
more than 0 atomic percent and less than 60 atomic percent of Ru, and comprising Pt the most and Ru the least of Pt, Si and Ru.

15. The die for molding optical devices according to claim 14, wherein the corrosion resistant and heat resistant alloy is attached to a base.

16. The die for molding optical devices according to claim 14, wherein a surface for replicating optical surface for molding an optical surface of a optical device is formed on the corrosion resistant and heat resistant alloy.

17. The die for molding optical devices according to claim 16, wherein plural hollows or plural projections corresponding to plural projections or plural hollows are formed on the surface for replicating optical surface such that the plural hollows or plural projections are formed on the optical surface of the molded optical device.

18. The die for molding optical devices according to claim 14, wherein a surface for replicating geometrical size base level for molding a surface of geometrical size base level of the optical device is formed on the corrosion resistant and heat resistant alloy.

* * * * *